US009919443B2

(12) United States Patent
Zuech et al.

(10) Patent No.: US 9,919,443 B2
(45) Date of Patent: Mar. 20, 2018

(54) SYSTEMS, METHODS, AND COMPUTER READABLE MEDIA FOR SHEET REGISTRATION IN A TRACTORLESS SHEET PROCESSING DEVICE USING AT LEAST ONE EXISTING SHEET FEATURE

(71) Applicant: BELL AND HOWELL, LLC, Durham, NC (US)

(72) Inventors: Joseph Zuech, Hillsborough, NC (US); Mark Burgess, Roseville, CA (US); William V. Pickering, Jr., Raleigh, NC (US)

(73) Assignee: Bell and Howell, LLC, Durham, NC (US)

( * ) Notice: Subject to any disclaimer, the term of this patent is extended or adjusted under 35 U.S.C. 154(b) by 247 days.

(21) Appl. No.: 14/824,531

(22) Filed: Aug. 12, 2015

(65) Prior Publication Data

US 2016/0046033 A1 Feb. 18, 2016

Related U.S. Application Data

(60) Provisional application No. 62/036,456, filed on Aug. 12, 2014.

(51) Int. Cl.
*G06F 7/66* (2006.01)
*B26D 5/00* (2006.01)
(Continued)

(52) U.S. Cl.
CPC .......... *B26D 5/007* (2013.01); *B65H 23/046* (2013.01); *B65H 35/06* (2013.01);
(Continued)

(58) Field of Classification Search
CPC ...... B26D 5/007; B65H 23/046; B65H 35/06; G05B 19/41865
See application file for complete search history.

(56) References Cited

U.S. PATENT DOCUMENTS

2003/0015564 A1\* 1/2003 Crowley ............. B41J 11/0005
226/31
2011/0121064 A1 5/2011 Van Gorp et al.
(Continued)

FOREIGN PATENT DOCUMENTS

EP 0579461 A1 1/1994
EP 2406141 B1 12/2013
(Continued)

OTHER PUBLICATIONS

Extended European Search Report for Application No. 15180701.3 dated Feb. 3, 2016.
(Continued)

*Primary Examiner* — Vincent Tran
(74) *Attorney, Agent, or Firm* — Jenkins, Wilson, Taylor & Hunt, P.A

(57) ABSTRACT

Systems, methods, and computer readable media for sheet registration in a tractorless sheet processing device using existing sheet features are disclosed herein. In some aspects, the systems can include a tractorless sheet processing device having a cutter for cutting individual sheets from continuous form material and a cutter feeder for feeding the continuous form material to the cutter. The systems can also include a camera disposed relative to the cutter feeder and configured to capture an image of a position of at least one existing sheet feature on at least one or more of the individual sheets of the continuous form material in order to synchronously register each of the individual sheets with the cutter, and a controller including at least one hardware processor and memory, the controller being configured to interface with the camera and the tractorless sheet processing device.

20 Claims, 19 Drawing Sheets

(51) Int. Cl.
    *G05B 19/418* (2006.01)
    *B65H 23/04* (2006.01)
    *B65H 35/06* (2006.01)
(52) U.S. Cl.
    CPC .... *G05B 19/41865* (2013.01); *B65H 2301/12* (2013.01); *B65H 2301/5151* (2013.01); *B65H 2553/42* (2013.01); *G05B 2219/50074* (2013.01)

(56) References Cited

U.S. PATENT DOCUMENTS

| | | | |
|---|---|---|---|
| 2012/0194791 A1* | 8/2012 | Duss | B41F 13/025 355/53 |
| 2015/0053349 A1* | 2/2015 | Mori | B31F 1/2836 156/355 |
| 2015/0088296 A1* | 3/2015 | Suzuki | B26D 5/007 700/128 |

FOREIGN PATENT DOCUMENTS

| | | |
|---|---|---|
| EP | 2727481 A2 | 5/2014 |
| WO | WO2010103441 | 1/2012 |

OTHER PUBLICATIONS

Extended European Search Report for Application No. 15180701.3 dated Jan. 27, 2016.
Notice of Publication for Application No. 15180701.3 dated Feb. 3, 2016.

\* cited by examiner

SYSTEMS, METHODS, AND COMPUTER READABLE MEDIA FOR SHEET REGISTRATION IN A TRACTORLESS SHEET PROCESSING DEVICE USING AT LEAST ONE EXISTING SHEET FEATURE

CROSS-REFERENCE TO RELATED APPLICATION

This application relates to and claims priority to U.S. Provisional Patent Application Ser. No. 62/036,456 filed Aug. 12, 2014, the disclosure of which is incorporated by reference herein in the entirety.

TECHNICAL FIELD

The present subject matter relates to techniques and equipment for feeding paper material into a cutter device and registering the paper material with a cutter blade, where continuous proper registration of cutting of the paper material into sheets is maintained to prevent a outline from migrating into the sheet. More particularly, the present subject matter relates to systems, methods, and computer readable media for sheet registration in a tractorless sheet processing device using existing sheet features.

BACKGROUND

Traditionally, registration of continuous form material with a cutter blade is known to be an operator intensive process that requires constant overview and supervision in order to prevent cut line drift due to slippage of the material, which may cause loss of sheet registration and synchronization. In order to avoid slippage of the continuous form material during registration, cutter feeders have been known to use tractor feed pin holes formed on an edge of continuous form or sheet material in order to index feed the continuous form material to cutter blades of cutters. For example, where a tractor feeder is configured with a pin assembly, individual pins of the pin assembly may project through tractor feed pin holes formed on an edge of the continuous form material. A shaft may be configured to drive the pin assembly and thereby advance the continuous form material a predetermined number of pin holes to move the continuous form material one sheet length to position the lead edge of each successive form up to a cutter blade position. In order to ensure there is no slippage, a cover assembly may be positioned over the pin assembly in order to trap the continuous form material between the cover assembly and the pin assembly. A pin assembly channel in the cover may enclose the pins in the pin assembly to prevent the continuous form material from falling off the pins of the pin assembly during transport.

Alternatively, tractor feeders may accomplish registration of continuous form material by utilizing existing sync marks printed on at least one or more form of the continuous form material. For example, in a 2-up cutter configuration, only one sync mark is required per side as the two sheets are fed and cut together. While for a slit and merge "over-under" dual tractor cutter configuration, for example, a printed sync mark is required on each of the two sheets that are slit and fed separately. During a webbing process, an operator may manually advance the sheet until the sync mark is detected. Cutter controls may be configured to then advance and position a top of a form to a cutter blade by determining a distance of a sync mark to the top of the form. A sync mark "window" may also be defined to so that the cutter control does not falsely detect other print marks as the sync mark.

However, although tractor feeders such as those described above tend to prevent slippage of the continuous form material during a registration process, these tractor feeders are being eliminated and replaced with new "pin-less cutters". Yet, new pin-less cutters require additional manual registration management, on top of what is required for conventional registration and/or synchronization. For example, a pin-less tractor feeder assembly may require a lead edge detector in a cutter feeder and at least one additional printed sync mark where a distance is known between a lead edge and the sync mark.

Hence, a need exists for systems, methods, and computer readable media for sheet registration in a tractorless sheet processing device using existing sheet features in order to eliminate the need to use printed sync marks for alignment during the automatic initial web loading and cyclic operation of non-tractor pin-less transport and cutter. Notably, the systems, methods, and computer readable media provided herein are able to cooperate with material that does or does not have pin holes, by sensing a specific unique feature already printed on the sheet to use as a sync mark.

SUMMARY

Accordingly, systems, methods, and computer readable media for sheet registration in a tractorless sheet processing device using existing sheet features are disclosed herein. In some aspects, systems for sheet registration can comprise a tractorless sheet processing device including a cutter for cutting individual sheets from continuous form material and a cutter feeder for feeding the continuous form material to the cutter. The systems can also comprise a camera disposed relative to the cutter feeder and configured to capture an image of a position of at least one existing sheet feature on at least one or more of the individual sheets of the continuous form material in order to synchronously register each of the individual sheets with the cutter, and a controller including at least one hardware processor and memory, the controller being configured to interface with the camera and the tractorless sheet processing device.

In other aspects, methods for sheet registration can be performed at a controller including at least one hardware processor and memory. The methods can comprise interfacing with a camera and a tractorless sheet processing device including a cutter and a cutter feeder in order to control the camera and the tractorless sheet processing device, feeding, by the cutter feeder, continuous form material to the cutter for cutting individual sheets from continuous form material, and capturing, by the camera, an image of a position of at least one existing sheet feature on at least one or more of the individual sheets of the continuous form material in order to synchronously register each of the individual sheets with the cutter.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
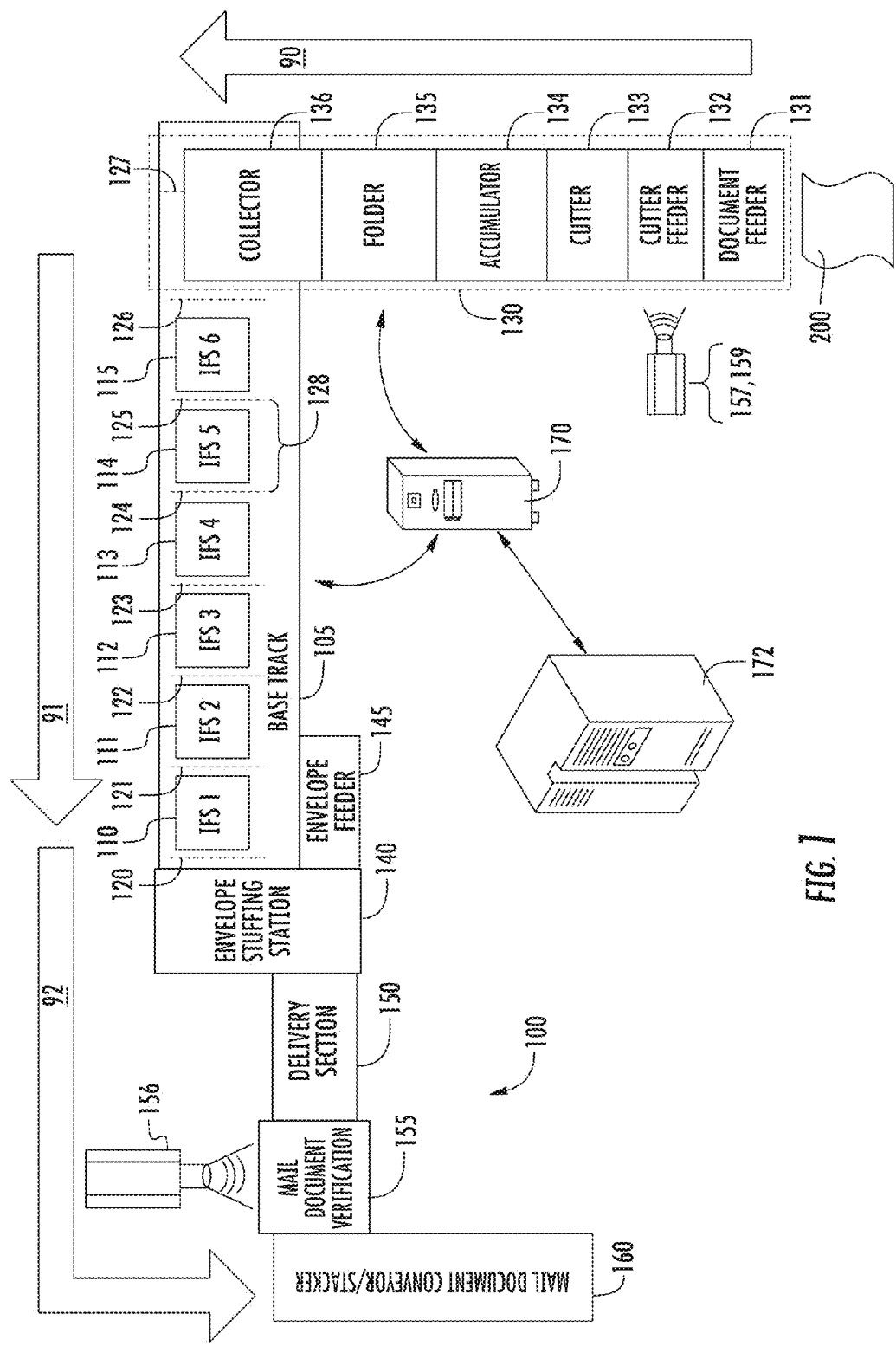
FIG. 1 illustrates a generic block diagram of an inserter on which a cutter system that does not use a tractor feeder is installed according to some embodiments of the present subject matter.

Accordingly, systems, methods, and computer readable media for sheet registration in a tractorless sheet processing device using existing sheet features are disclosed herein. Notably, the systems, methods, and computer readable media disclosed herein alleviate one or more of the above noted problems with tractorless transport feeders and cutters that use legacy pin holes or already existing material printed on the sheet to control material loading and sheet synchronization during continuous operation by utilizing at least one existing feature on the sheet for registering the sheet. Thus, advantageously, the systems, methods, and computer readable media disclosed herein may provide for automatically loading, registering, and synchronizing tractorless transport feeders and cutters without significant setup by an operator, while the material remains in synchronized registration with the cutter blade during continuous processing.

The advantages and novel features are set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations described herein.

Notably, a camera may be used, whether or not the material comprises pin holes, to detect at least one existing unique feature on at least one or more individual sheet. As defined herein, at least one existing feature' can include a feature of the sheet included for purposes other than registration. For example, at least one existing feature can include a control barcode or an image pattern, as well as at least one pin hole. The at least one existing sheet feature can be used as a sheet positioning feedback method when used on a pin-less feed cutter. Thus, the camera "sensing" of the existing feature, can be used in place of printed sync marks to determine cutter variation and insure proper cutter alignment during the initial web loading and cyclic operation of the non-tractor pin-less cutter. In addition, use of the existing camera system, already required for control barcode reading, eliminates the need and cost of separate sync mark sensor(s).

Inserter operations that maintain the use of "legacy" pin feed cutters currently don't have to print a unique cutter registration sync mark because the equipment they currently use employs tractor feed mechanisms. Current manufacturers of "pin-less" cutters require printed sheets to have a unique cutter registration mark. By contrast, the presently disclosed systems, methods, and computer readable media may enable inserter operations to use existing "legacy" cutter print applications without having to change the printing to add an additional mark to the sheet. For a slit/merge over/under pin-less feed cutter manufacturer, two unique cutter registration sync marks are eliminated, one on either side of the 2-up sheet as the sheet is slit and merged prior to the over/under cutter feed paths. Where the material has tractor feed pin holes, these holes are used as a sheet positioning feedback method when used on a pin-less feed cutter. The pin-feed holes are available with tractor feed material and can be used in place of printed sync marks to insure proper cutter alignment during the initial web loading and cyclic operation of the non-tractor pin-less cutter.

As disclosed hereinbelow, the various systems, methods, and computer readable media may relate to Inserter systems or wrapper systems using continuous form material (e.g., roll or fan fold material) as input to form documents to be mailed. However, in contrast with current Insert operations, the presently disclosed subject matter uses camera technology to locate a existing feature on every sheet for cutter registration and alignment in place of a separate printed synchronization mark. Steps a. through i. are a summary of the process to load, register and maintain registration synchronization used when pin holes are not present on the material. It should be noted that material with pin holes can be processed using the method, where the pin holes are ignored.

a. Use of an Area Scan Camera utilizing a charge-coupled device (CCD) array to locate a existing feature during the "cutter dwell" and reference the position of the existing feature (pixels) to a fixed physical reference on the cutter (also in the camera image). This can be used to determine the variation in distance between the existing feature and the fixed cutter reference on every cutter cycle in order to maintain cutter registration.

b. Use of an Area Scan (CCD Array) Camera to locate an existing feature during the "cutter dwell" and reference the position of the barcode (pixels) to the edge of the Field of View (FOV) of the camera. This can be used to determine the variation in distance between the existing feature and the edge of the FOV on every cutter cycle in order to maintain cutter registration.

c. Method described in (a) and (b) where the image is a logo or consistent image pattern on every sheet.

d. Method described in (a), (b) and (c) where camera system sends the distance measurement (pixels) to the Servo Feed Controller for cutter registration.

e. Method described in (a), (b) and (c) where camera system generates a bit output based on the encoder position reference to the distance measurement (pixel) variation (referenced from the start of the feed cycle).

f. Use of a Line Scan Camera to continuously acquire and process line by line the full sheet image using an encoder and to locate an existing feature and reference the position of the existing feature (pixels/encode pulses) from the top of the image. This can be used to determine the variation in distance between the existing feature and the top of the form with respect to the cutter blade on every cutter cycle in order to maintain cutter registration.

g. Method described in (f) where the image is a logo or consistent image pattern on every sheet.

h. Method described in (f) and (g) where camera system sends the distance measurement (pixels/encoder pulses) to the Servo Feed Controller for cutter registration.

i. Method described in (f) and (g) where camera system generates a bit output based on the encoder position reference to the distance measurement (pixel) variation (referenced from the start of the feed cycle).

Steps a. through d. refer to the use of "tractor feed" pin hole continuous form material on 2-up (side by side) and/or dual feed (over/under) "pin-less" cutters.

a. Use of a sensing device to sense the pin feed holes to automatically load and position the continuous form sheet to align and register to the top of the form when re-webbing the "pin-less" cutter.

b. Use of a sensing device to sense the pin feed holes to maintain proper form registration and cut positing during continuous feed operation.

c. Use of a sensing device to sense the pin feed holes to measure and validate that the amount of paper travel corresponds to the amount of linear movement of the pin-less feed mechanism in order to detect paper jam conditions.

d. Use of a sensing device to sense the pin feed holes to measure and validate that the amount of paper travel corresponds to the amount of linear movement of the pin-less feed mechanism and to compensate in the event of material slippage.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

FIG. 1 illustrates a document processing system 100, such as an inserting system, for processing continuous form material 200. The inserting system 100 may be, but is not limited to, the Bell and Howell ENDURO® or COMBO® inserting systems or Bell and Howell INVELOPER® wrapping system. An example of a wrapping system is described in U.S. Patent Application Pub. No. 2011/0121064, which is incorporated by reference in its entirety.

In some aspects, inserting system 100 can comprise a base track 105, which can be configured to transport partially assembled document material to be stuffed in an envelope. The contents of the envelope, whether using preformed envelopes or wrapped envelopes, may contain a document of one or more sheets and inserts such as but not limited to coupons, advertisements, and return envelops. The contents of the envelope are referred to as document material and the finished envelope is referred to as a mailpiece. The partially assembled document material may consist of a document assembled in an input channel 130 plus any inserts. The partially assembled document material may be moved down the base track 105 in a first direction 91 by a plurality of fingers 120-127. Fingers 120-127 may be attached to a continuous chain or belt to form track sections 128 between each finger pair. Fingers 120-127 may move in a continuous motion or may be indexed for each machine cycle.

An input channel 130 may be attached at one end of base track 105 in order to provide documents consisting of one or more pages to the base track 105. Multiple input channels in addition to input channel 130 may be attached to the base track 105. The input channel 130 may be configured to process and transport the document sheets from a document feeder 131 to a collector 136 in a second direction 90. Second direction 90 may be perpendicular to first direction 91. The input channel 130 may be configured to process multiple configurations of continuous form material 200, such as, for example, fan folded document sheets 220 (see, e.g., FIG. 2A) with a document feeder 131, which feeds the material into cutter feeder 132 and the cutter 133 to separate the fan folded material 220 into individual sheets that make up the document. Alternately, the document sheets may be printed on a paper roll and fed into cutter feeder 132 and a cutter 133 that will separate roll material 225 (see, e.g., FIG. 2B) into individual sheets.

Inserting system 100 may also include a line scan camera 157 or an area camera 159 located above the cutter feeder 132 that is configured to locate an existing document feature 58 (see, e.g., FIG. 4) or pin holes 218 (see, e.g., FIG. 3A) that are used in the control of the cutter feeder 132 and the cutter 133.

A controller 170 may be used by inserting system 100 for control therein. In some aspects, the controller 170 may include one or more computer, computing platform, or software being implemented in a processor (see, e.g., FIGS. 20-21). The controller 170 may be connected to a data center processor 172 to receive job data and supply job results. Alternatively, a cutter controller 300 (See, e.g., FIG. 10) may be used for all the processing for controlling the cut sequence. Inserter control parameters processed in the controller 170 include, but are not limited to, document sheet count, paper thickness, fold type and inserts required. For example, the controller 170 may take into account the speed of the cutter feeder 132 since speed is affected as the number of sheets in a document increase, making an accumulator 134 take longer to accumulate all document sheets. By way of further control examples, the document page count and material thickness will affect input channel 130 throughput since a folder 135 will take longer to fold a large page count document with thick paper. The type of fold also impacts throughput of the input channel 130 since letter folds, Z folds and half folds require variable times to complete. With the largest documents, the folder 135 may require multiple cycles and the collector 136 may then be used to collect each folder output. When the collector 136 is finished assembling the document, the collector 136 will place the document into a track section, such as section 128 adjacent to or under the collector 136, onto the base track 105.

The base track 105 generally can comprise one or more insert feeder stations (IFS) 110-115 to add additional insert material to the total material to be stuffed into the envelope to form a completed mailpiece. The IFS may be configured to feed inserts onto the base track 105 into track sections 128 formed for pairs of pusher pins 120-127. The document processing system setup has defined the characteristics of the material in each insert feeder station and the control computer 170 defines which documents get an insert from a given insert feeder station 110-115. The mailpiece is completed when the contents of a track section 128 are stuffed into an envelope from an envelope feeder 145 by an envelope stuffing station 140. A delivery section 150 can contain postage meters, with and without a scale, plus printers with a variable amount of printing required. Mail document verification 155 can utilize an optical reader such as a camera 156 to image each mail document for defects. For example, an out of order sequence number may indicate an improperly cleared and accounted for from a jam stoppage. Mailpiece verification 155 can assess many additional error checks that are well known by those skilled in the art. The completed mailpieces can be collected on the mailpiece conveyor/stacker 160 for sweeping into mail trays. A third direction of travel 92 of the mailpiece is from the envelope stuffing station 140 to the mail document conveyer/stacker 160. The third direction of travel 92 can be perpendicular to the first direction of travel 91 and substantially parallel to the second direction of travel 90.

Figure 2A:
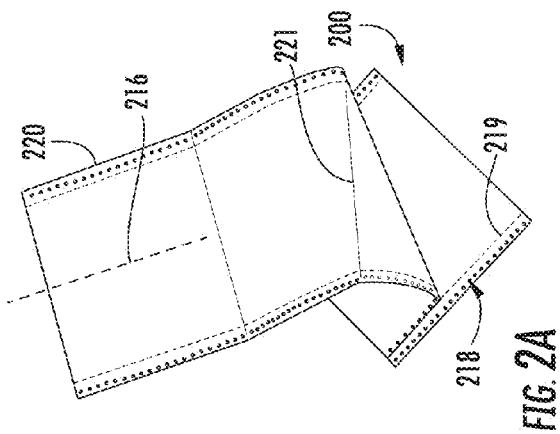
FIG. 2A illustrates features of input paper material in fan fold format according to some embodiments of the present subject matter.
Figure 2B:
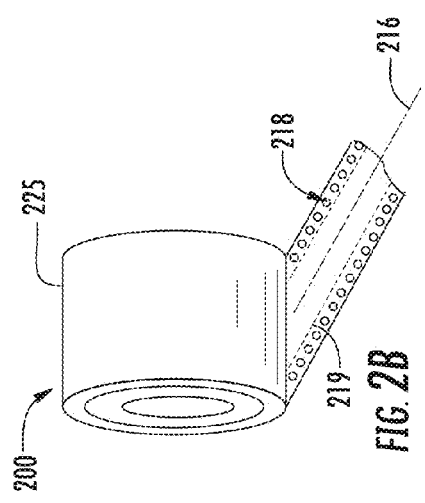
FIG. 2B illustrates features of input paper material in roll format according to some embodiments of the present subject matter.

Referring now to FIGS. 2A and 2B, input material 200 for an inserter input channel 130 can comprise the printed sheets that make up a document. FIG. 2A can comprise input material 200 in a fan fold format 220, while FIG. 2B can comprise input material 200 in a paper roll format 225. Either format may be one sheet wide or up to 4 sheets wide with current printing technology. The fan fold paper 220 can comprise a fold line 221 for each sheet or group of sheets in a row across. Fold lines 221 may be perforated to facilitate folding and sheet separation. A dual blade cutter (not shown) is often used to cut a "chip" off at fold line 221 since many customers object to the remaining part of the perforation. In addition, cutting a chip allows for additional tolerance on the cut registration. In some aspects, a slitter (not shown) may be used to slit each sheet at a boundary 216 between sheets. One or more slitters may be used depending on how many sheets are printed across the material 200. Regardless, both the fan fold 220 and roll paper 225 formats may have pin holes 218 and perforation 219 along the edge of the paper.

Figure 3A:
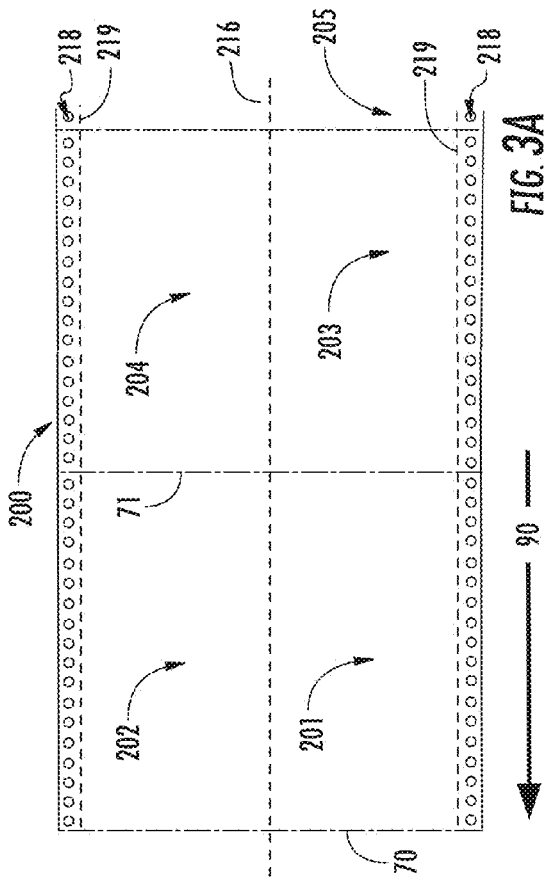
FIG. 3A illustrates a 2-up pin feed continuous form sheet that is fed into a 2-up, side by side cutter according to some embodiments of the present subject matter.

While there are multiple formats for printed input material 200, FIG. 3A illustrates a 2-up configuration with pin holes 218 and perforations 219 at edges of the continuous form material 200. In FIG. 3A, for example, a leading edge 70 of a sheet of the continuous form material 200 is advanced so that the material is positioned under a cutter that will cut along cut a line 71 across both side by side sheets. The print configuration is such that sheet one 201 of the document is printed in a bottom position and sheet two 202 is printed above sheet one 201. An actual orientation of the material is horizontal, side by side, in a cutter feeder 132. When the material is cut along cut line 71, both sheet one 201 is cut from sheet three 203 and sheet two 202 is cut from sheet four 204 in a single cut cycle using a blade that is two sheets wide. As the two sheets 201, 202 enter the cutter 133 in second direction 90, they are slit along a center slit line 216 to form two separate sheets. Side trimmer blades (see, gutter cut assembly 283, FIG. 6) are used to remove the tractor feed holes 218. For the exemplary illustration in FIG. 3A, sheet one 201 is transported into the accumulator 134 followed by sheet two 202 in an over accumulate configuration (first sheet is on the bottom). This sequence of over accumulation continues until all pages of the document are accumulated at which time the document is advanced into the folder 135.

Figure 3B:
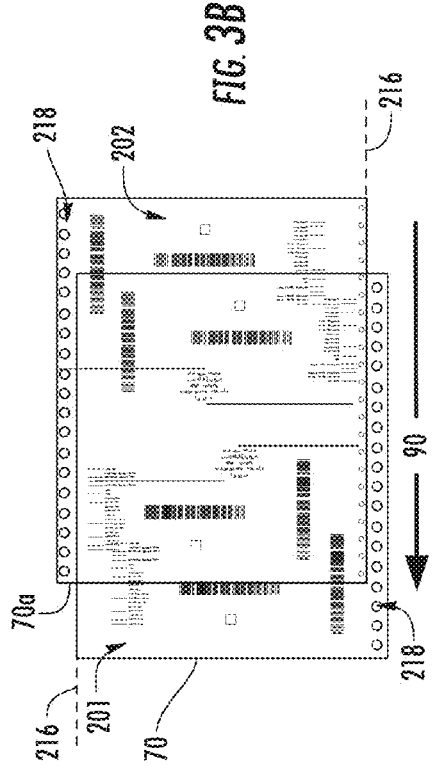
FIG. 3B illustrates a 2-up pin feed continuous form sheet that is slit and merged over/under into a cutter according to some embodiments of the present subject matter.

Another common configuration is illustrated in FIG. 3B, which illustrates a 2-up pin continuous form sheet that is slit along line 216 and merged over/under into the cutter feeder 132. Sheet one 201 is on a bottom channel while sheet two 202 is on a top channel in an over/under merge configuration. When running on an over/under pin-less cutter feeder 132, the 2-up sheets illustrated in FIG. 3B are slit along the center line 216 with the resulting two material webs merged one on top of the other. The upper and lower channels are independent, but synchronized for proper document assembly. Each channel can comprise the same features and function as described in reference to FIGS. 7-12. Gutter cut assemblies 283 are used to remove the tractor feed holes 218. Each channel of the cutter feeder 132 is configured with two separate servo driven roller transports to drive either sheet to the respective cutter blade in second direction 90. The leading edge 70 of the under sheet 201 is illustrated as significantly advanced from the leading edge 70a of the over sheet 202 in FIG. 3B to clarify the over/under configuration. If both sheets are part of the same document, both leading edges 70 and 70a of sheets 201 and 202 are aligned together and may be cut simultaneously by their respective blade. If only one sheet belongs to the document in the accumulator 134, it is fed and cut separately.

Figure 4:
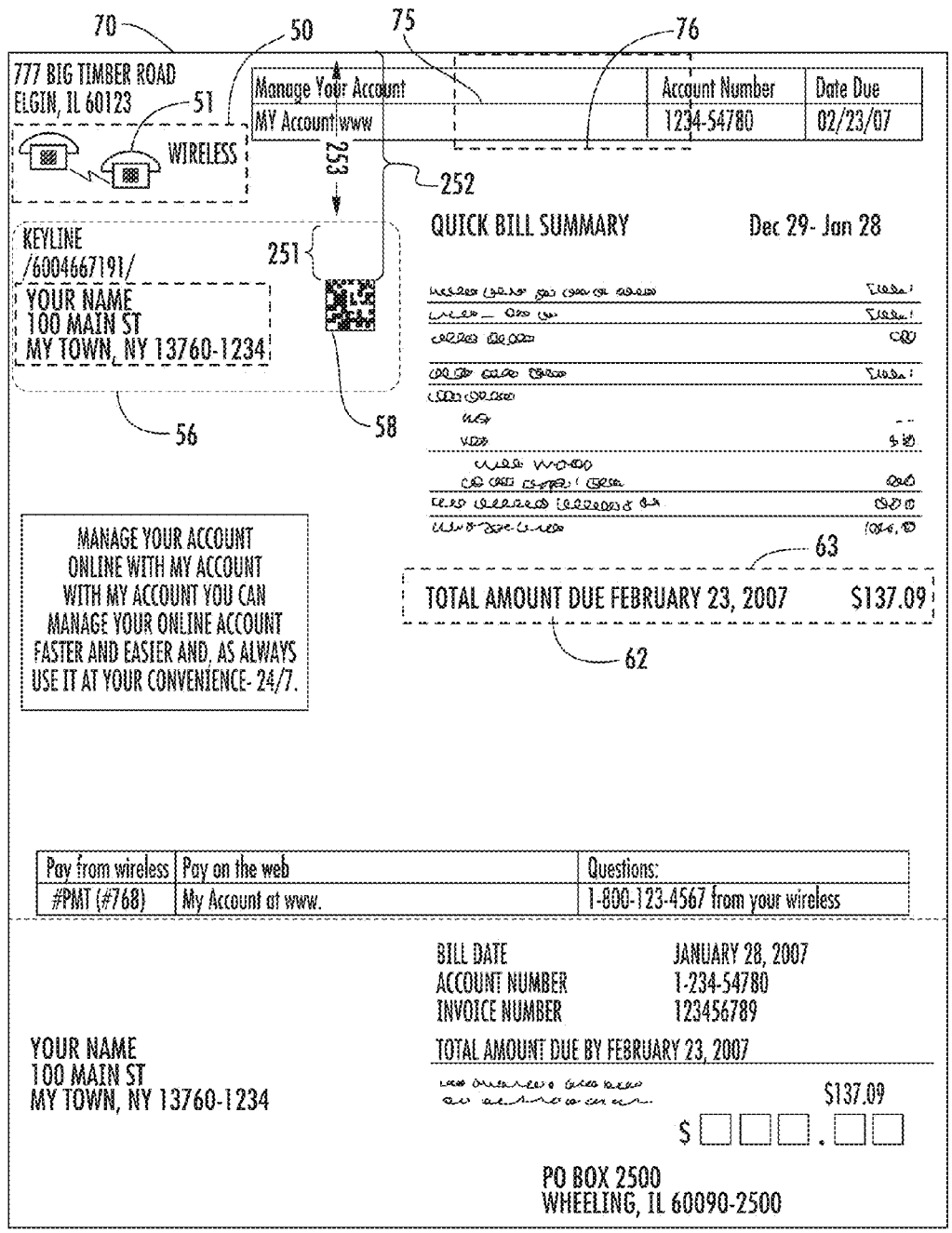
FIG. 4 illustrates an exemplary printed sheet without pin holes identifying features that are candidates for replacing printed sync marks according to some embodiments of the present subject matter.

Cutter registration and synchronization for material 200 without pin holes uses a camera system 157, 159 to identify and locate printed material on the document sheets that has a consistent and known location on the sheet (i.e., existing sheet features). This printed material will serve as a sync mark during material 200 loading and registration. The first sheet of the document may use different features due to a special format of a cover sheet. FIG. 4 illustrates some of the possible existing features, image patterns or text that may be used to act as a sync mark for loading and for registration. For an existing feature, for example, image pattern or text to be used as a sync mark, the distance from the lead edge of the sheet 70 to the chosen sync mark may be known in terms of number of pixels, encoder pulses, and/or a measurement extracted from the print file used for the material printing. For example, distance of the data matrix barcode 58 to the top of the sheet 70 is the sync mark position 252 relative to the top of the page 70. As an aid to the camera system 157, 159, location and identification processing of a sync mark, a FOV (Field of View) or ROI (Region of Interest) 56 is identified for a chosen existing feature. Even though many line scan camera systems 157 will scan the entire sheet, a defined ROI will speed up the processing and improve accuracy. For an area camera system 159, a FOV may be defined so that the camera may be correctly positioned over the cutter feeder 132 paper path to be able to trigger the image capture and process the existing feature. Since the FOV 56 may not include the top of the page and the sync mark, the distance 252 may not be measured directly. Instead, the distance the sheet has traveled since the last cut cycle enables measurement from the top of the FOV 56 to the top of the sheet 70, distance 253. The distance 251 from the top of the data matrix 58 to the top of the FOV 56 is measured by the area camera system 159. The sum of distances 251 and 253 equals the required distance 252. Other printed material can include, but is in no way limited to, a logo 51 with a FOV or ROI of 50, a highlight bar 75 with its FOV or ROI of 76 or text 62 with its FOV or ROI of 63.

Figure 5:
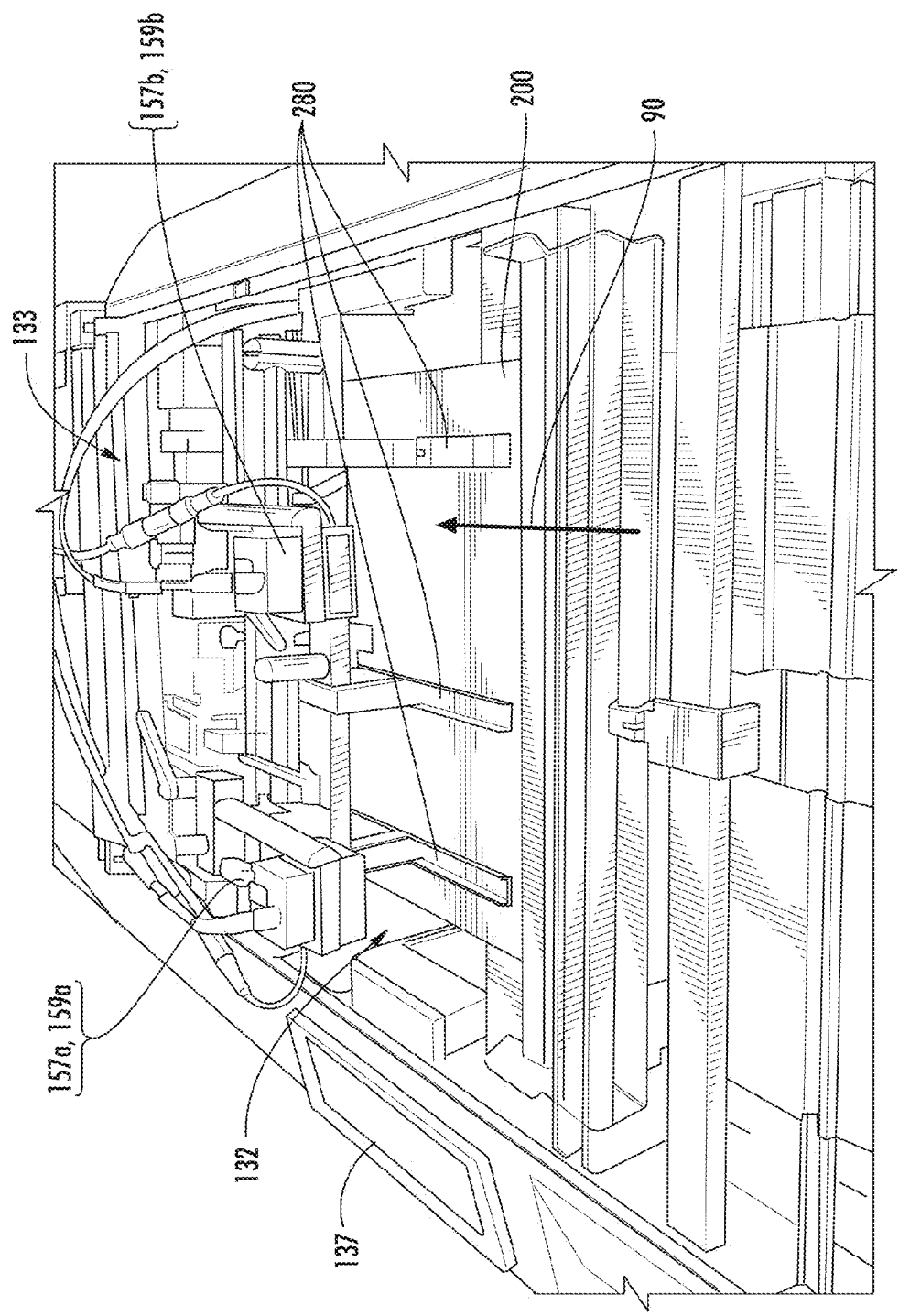
FIG. 5 illustrates an exemplary isometric view of material without pin holes traveling across a cutter feeder towards a cutter according to some embodiments of the present subject matter.
Figure 6:
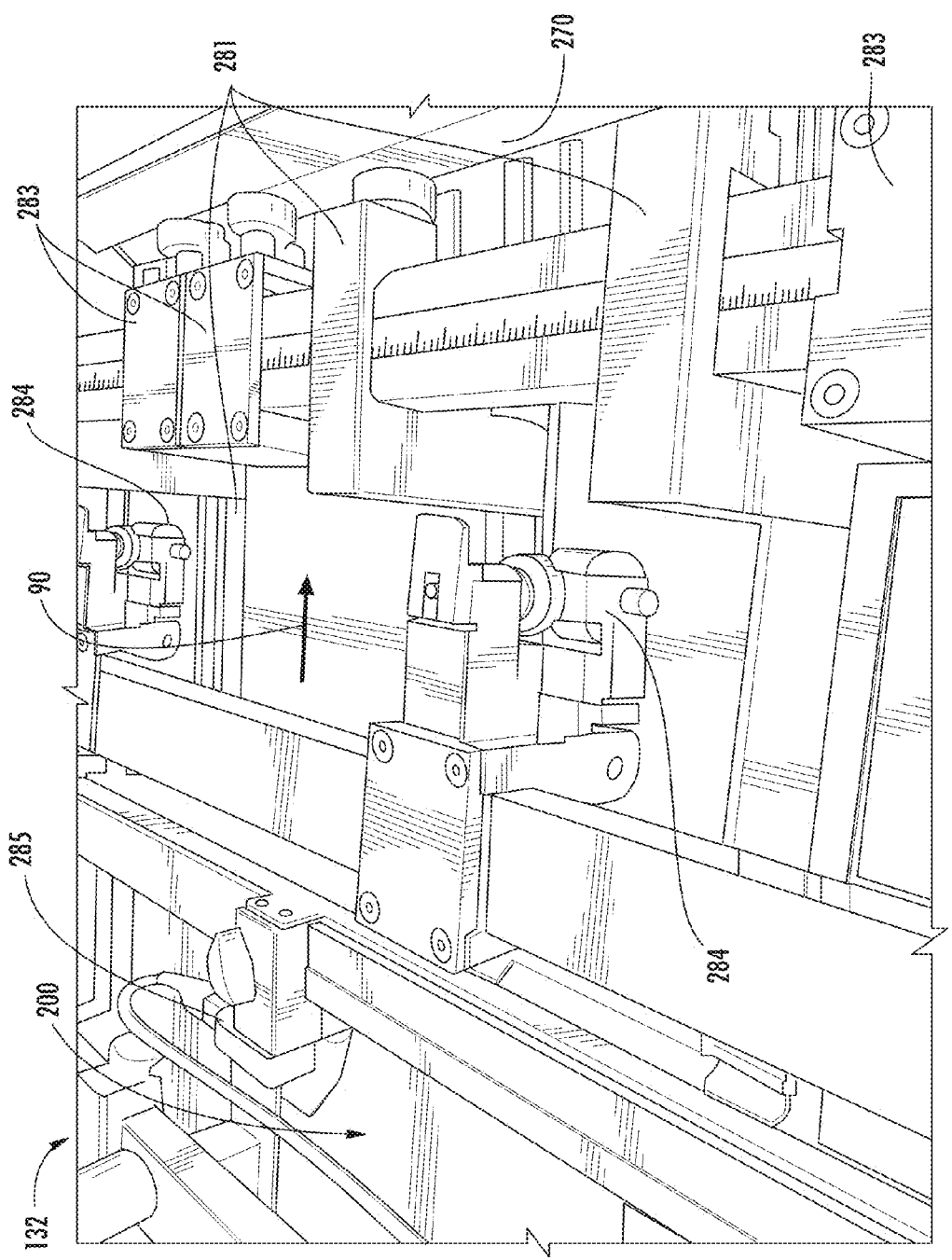
FIG. 6 illustrates an exemplary isometric right side view of material without pin holes traveling along a cutter feeder towards a cutter according to some embodiments of the present subject matter.

Turning now to FIGS. 5-6, a tractorless feeder that uses 2-up material 200 without pin holes 218 on the edge is illustrated. FIG. 5 is an isometric view looking across the cutter feeder 132 toward the cutter 133. In FIG. 5, the paper material 200 is moving in second direction 90. The material 200 may be advanced in the cutter feeder 132 by using an operator interface 137 disposed with regard to the cutter feeder 132 for easy accessibility by an operator. In some aspects, a feature detect camera 157a, 159a is mounted above and along the left edge of the material 200 transport path. This location is used because many of the existing features referenced in FIG. 4, are printed in this area on every page. An alternative feature detect camera 157b, 159b is mounted near the center of the material to image and identify alternate features for use if a primary, existing feature is of poor quality. In addition, page one of a document often has a very different layout which results in having to search for a different existing feature. Both types of cameras 157a and/or 159a and 157b and/or 159b are movable along a mounting track to allow for repositioning required for different jobs. A first set of movable paper guides 280 are mounted adjacent to the cameras to ensure that the paper is not distorted during image capture.

Alternatively, in some aspects, a full page width line scan camera system (not shown) is already included to perform additional functions, such as, but not limited to, print quality inspection, barcode reading page sequence verification, etc. An example of this camera system is the Bell and Howell LLC, JETVISION® system, which is capable of locating a specified existing feature anywhere on a page. Advantageously, such an approach would eliminate the need for the feature detect cameras mentioned above.

FIG. 6 is an isometric view looking across the cutter feeder 132 from the right side, as material 200 travels in second direction 90. The material 200 is driven through the cutter feeder by powered rollers (see, 265, FIG. 7) beneath the material 200. Two drive roller idlers 284 are positioned above and in contact with the material 200 to ensure positive drive without slippage. This view shows the location of the cutter blade 270 which is configured to cut 2-up wide material 200. A second set of paper guides 281 are positioned across the material 200 to hold the material edges in place. An additional paper guide 281 is positioned near the center of the material 200 to stabilize the material during the center slitting operation. In some aspects, the 2-up material 200 that enters the cutter feeder may be an inch wider than the 17 inches required for two 8.5" by 11" pages side by side, in order to compensate for poor print quality at the page edge. Likewise, the 2-up material 200 can be sized accordingly for A4 size paper, legal sized paper, etc. Two gutter cut assemblies 283 are positioned at the edges of the material to cut off a half inch from each edge. A third gutter cut assembly is positioned between the two edge gutter cut assemblies 283 to perform the center slitting. A material present detector 285 is used for error and jam detection and is located near the input to the cutter feeder 132. A lead edge detector (not shown) is located near the idler rollers 284 to be used in setup.

Figure 7:
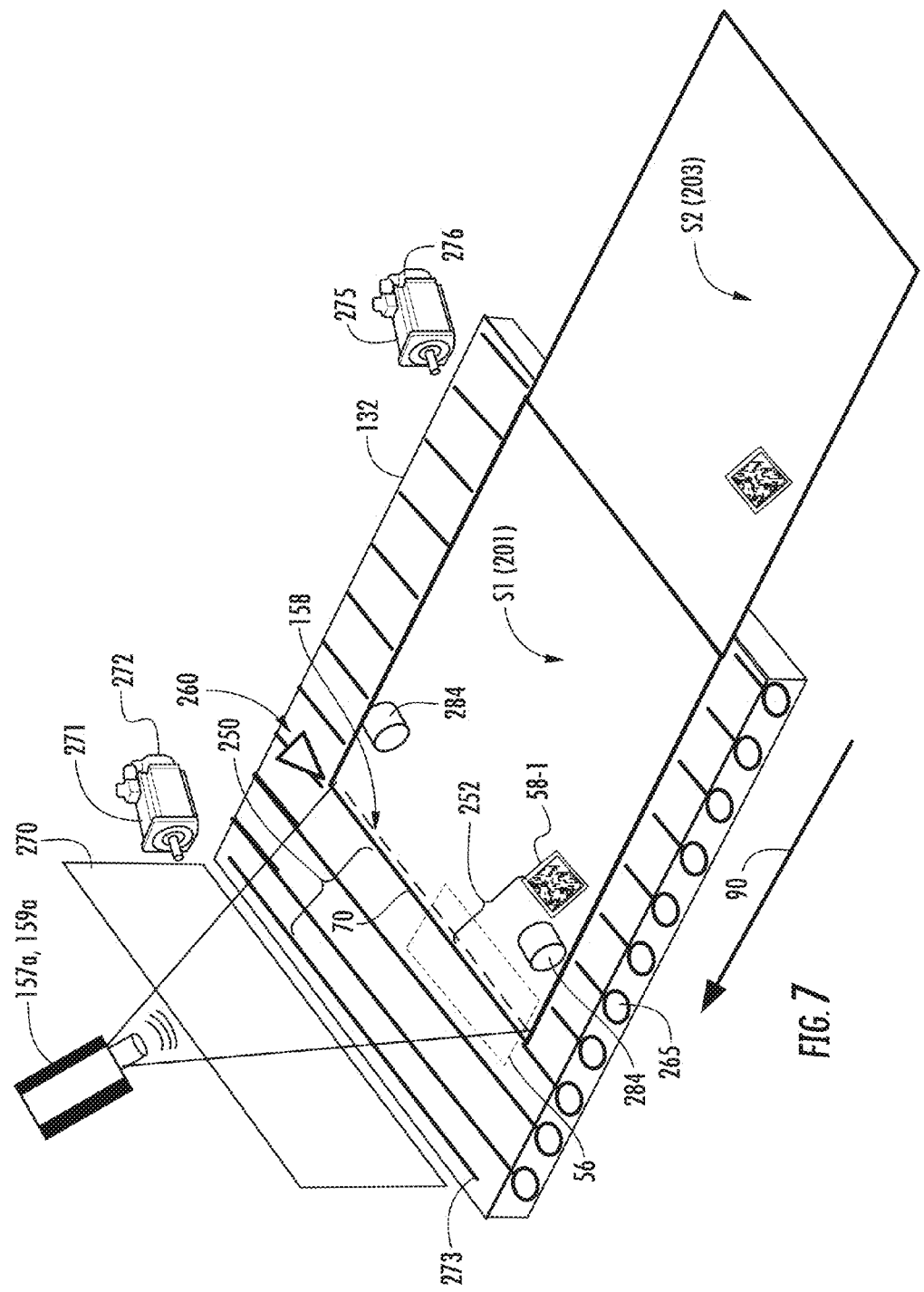
FIG. 7 illustrates a functional diagram of a material loading process and initial synchronization with a cutter for material without pin holes according to some embodiments of the present subject matter.
Figure 8:
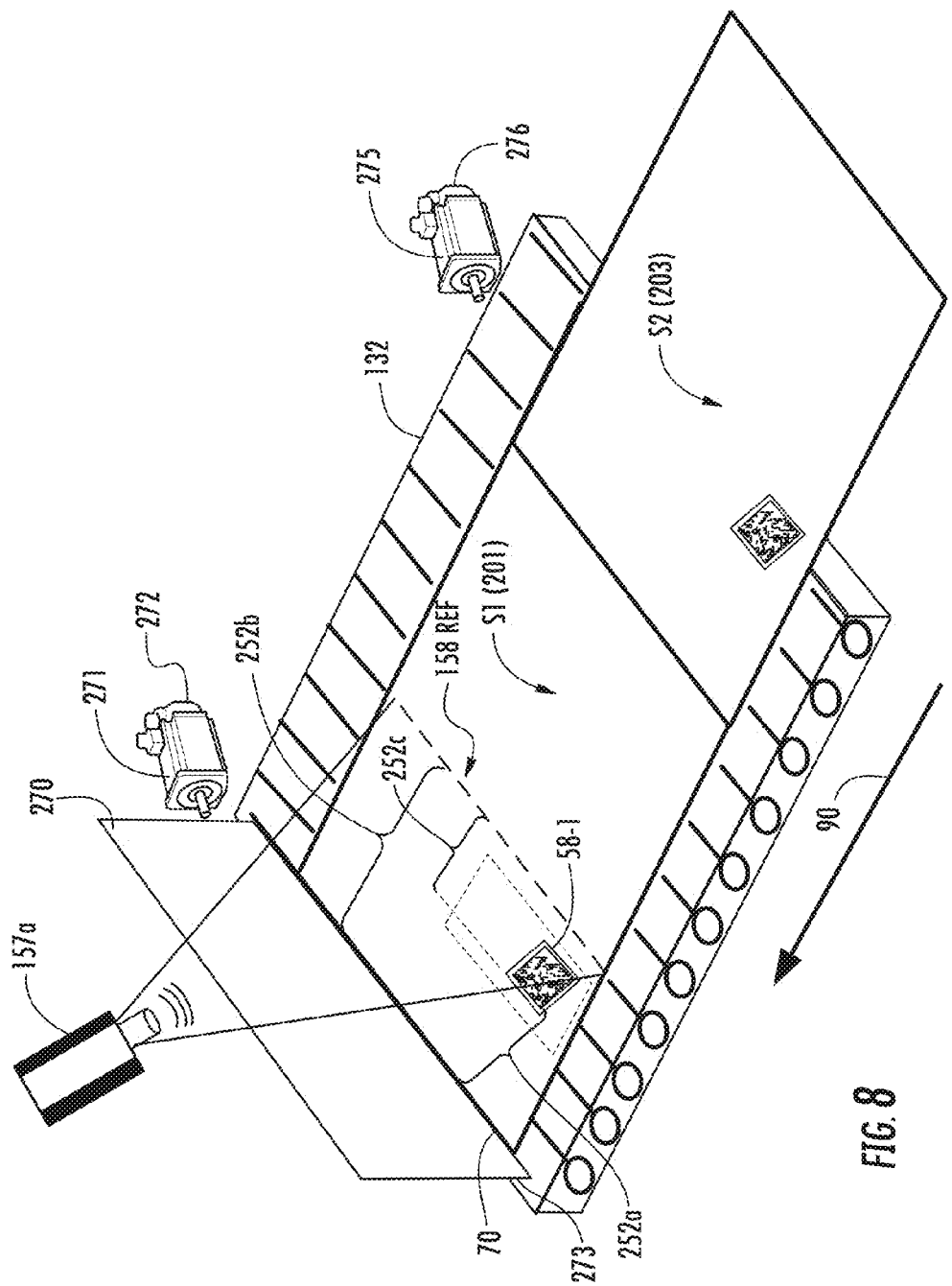
FIG. 8 illustrates a functional diagram of a sheet of material without pin holes positioned for initial synchronization according to some embodiments of the present subject matter.
Figure 9:
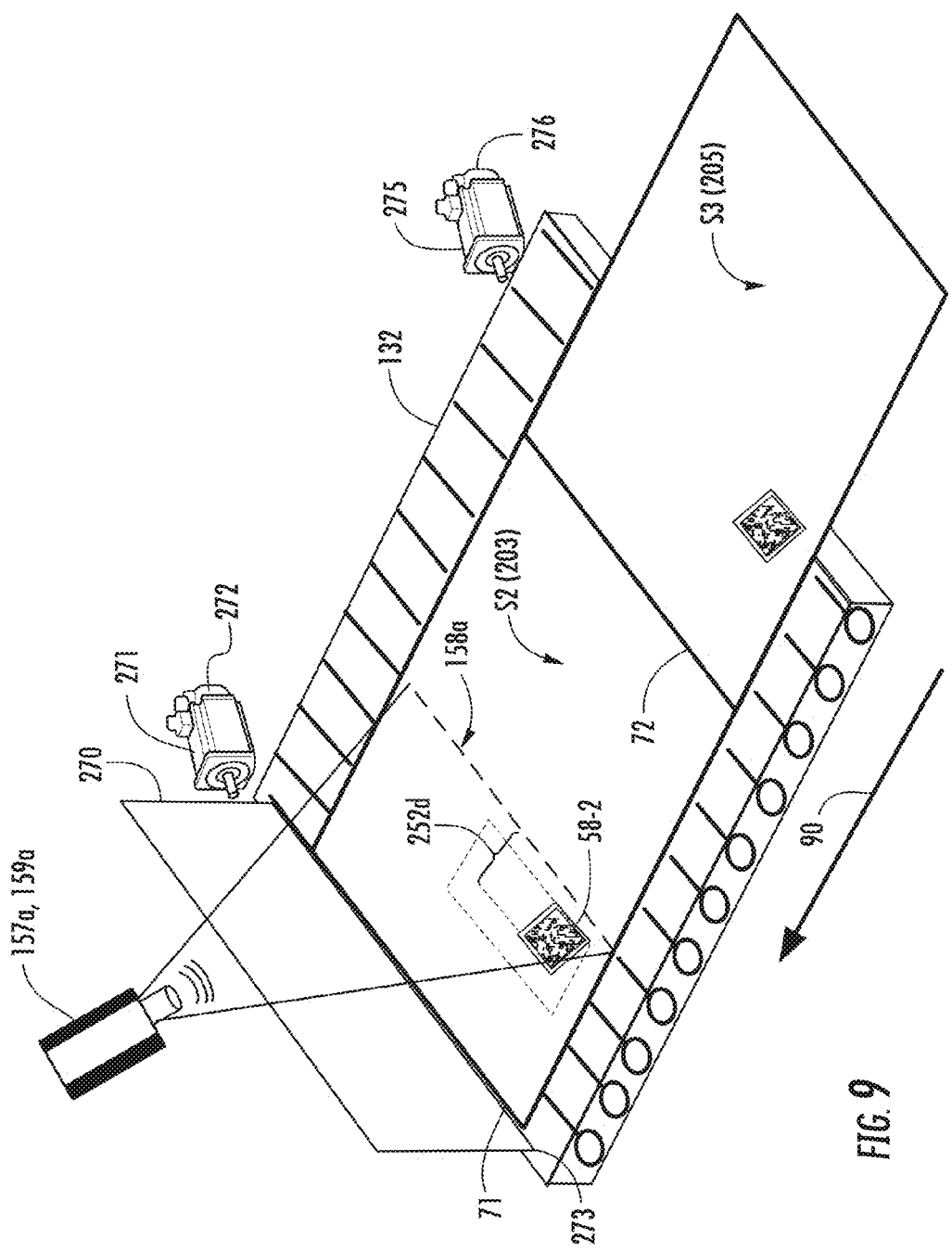
FIG. 9 illustrates a functional diagram of a subsequent sheet of material without pin holes for which a cut position adjustment is required to maintain cutter sync with already printed material according to some embodiments of the present subject matter.

FIGS. 7-9 are functional diagrams that are used to explain the pin-less cutter feeder 132 operation. FIGS. 7-9 depict utilization of an area camera 159a and/or a line scan camera 157a to locate a existing feature 58-1, 58-2 to use for sheet synchronization of sheets S1 (201), S2 (203), S3 (205), . . . , SN, where N is an integer, of material 200. FIGS. 7-9 are not intended to show actual hardware implementation.

In reference to FIG. 7, a channel of a slit and merge over/under cutter feeder 132 is illustrated, where sheets S1 (201), S2 (203) of material 200 are processed. Initially, an operator may load the material 200 into the cutter feeder 132 until the material 200 is captured by the nip formed by the drive roller 265 and the drive roller idlers 284. Sheet S1 (201) is then advanced by a cutter controller (e.g., 300, FIG. 10) into the cutter feeder 132 until the leading edge 70 is detected by the leading edge sensor 260. When the leading edge 70 is detected, the sheet S1 (201) is at a known distance 250 from the cut line 273 based on a known geometry of the cutter feeder 132. A distance 252 from the lead edge 70 to the top of the existing feature 58-1 also is a known value based on data from the print file. Each of these values (e.g., 250, 252) can be stored in a storage device associated with controller 170.

An area camera 159a can be used to capture an image of a position of existing feature 58-1. The area camera may be configured as a camera utilizing a charge-coupled device (CCD) Array to capture a rectangular image FOV (e.g., 640×480 pixels), as illustrated by the dotted outline 56. Other camera FOVs are common, based on the CCD array size. For example, 768×640 or 1024×768 arrays also are common. The size of each pixel is determined by camera optics, focal distance, and lens configurations. Typical pixel sizes are approximately 0.003 inches. Notably, the FOV 56 should be sized to include a ROI that encompasses the existing feature 58-1. The FOV size also should be sized based on positioning errors of the FOV due to material 200 slippage and servo motor 275 distance control accuracy. The area camera 159a can be positioned over the cutter feeder 132 and aimed so that the FOV 56 is at a known position relative to the transport 132. Common reference points can comprise a distance from the cut line 273 to a top of the FOV 56, or a distance from a top of the FOV 56 to the lead edge detection point 260. The area camera 159a can be triggered for image capture (e.g., area camera sync 312, FIG. 10), when the sheet S1 (201) has moved a sufficient distance to place the existing feature 58-1 within the FOV 56. The distance required to place the existing feature 58-1 within the FOV 56 is a calculation based on the distance 252 (i.e., lead edge 70 to top of existing feature 58-1) and the distance the lead edge 70 can move to place the feature 58-1 within the desired position in the FOV 56. The FOV 56 is a fixed area on the cutter feeder 132 since the position of the area camera is fixed in position for a given inserting job.

For the initial cycle, sheets S1 (201), S2 (203), and S3 (205) are moved a distance 250, lead edge 70 to the cut line 273. Thereafter, the sheets S1 (201), S2 (203), and S3 (205) can be moved a sheet length, plus or minus a sync correction distance calculated during a previous cut cycle. Subsequent image capture is triggered based on a blade cycle when the cutter 133 is registered during a cut cycle dwell.

Those skilled in the art may select alternate methods to determine cutter variation and registration in order to measure a number of pixels between the existing feature to the edge of the FOV. Another method is to have a fixed "cutter reference" point located in the same FOV as the existing feature and measure a number of pixels to the known physical reference of the cutter. The distance variation measured by the camera system 157a, 159a can be communicated to a cutter servo control via a message protocol. An alternative is to use an encoder and to output a "sync" bit off of the differential distance based on the number of pixels measured from the start of the feed cycle. This would allow use of this solution on any pin-less cutter, in place of the "sync mark" sensor.

Figure 10:
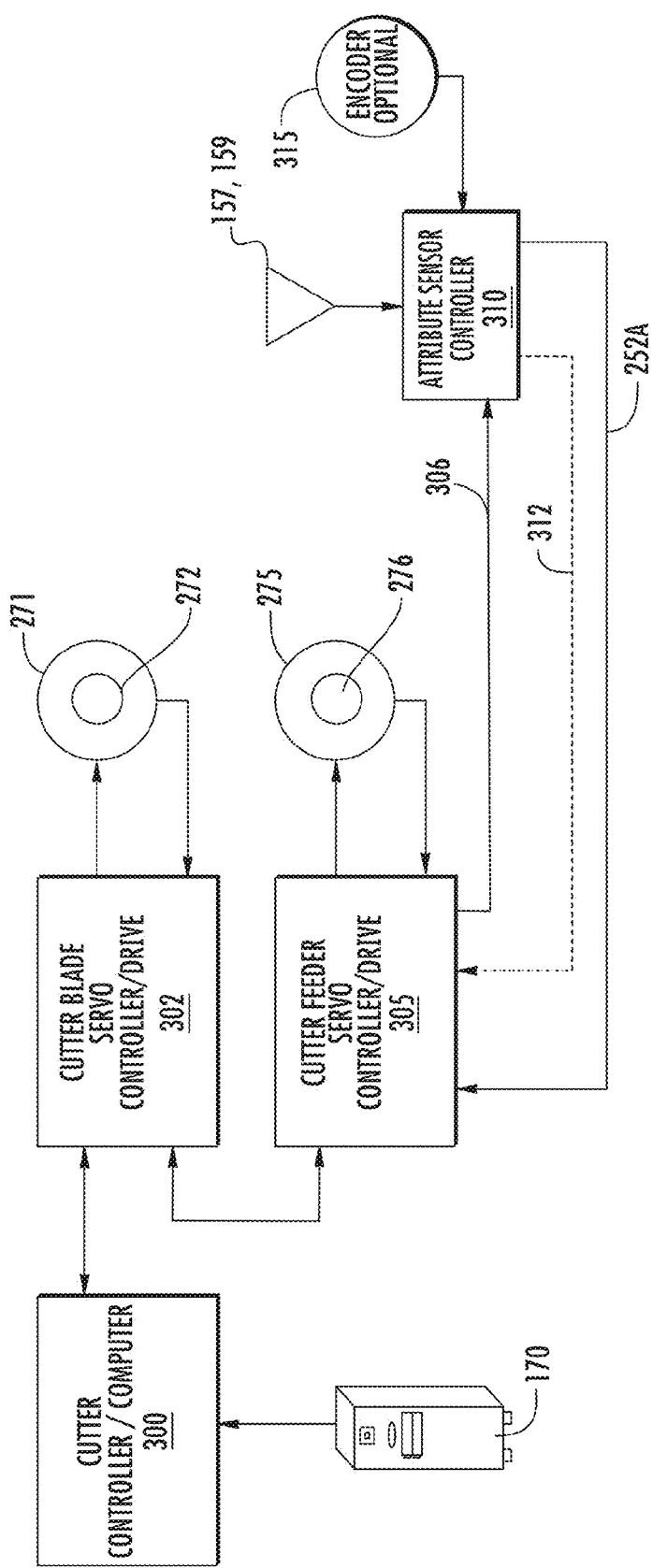
FIG. 10 illustrates an exemplary block diagram of a cutter and servo feed control system and a camera used to measure a position of at least one existing unique feature on individual sheets of material according to some embodiments of the present subject matter.

FIG. 7 also illustrates the use of a line scan camera 157a system to capture the image of a full sheet containing the existing feature 58-1, such as text, barcode or image pattern. With reference to FIG. 10, a the line scan camera 157a can be configured to utilize an encoder 315 to trigger the camera scan at fixed positional intervals, determined by the encoder count and the travel distance of one revolution of the drive mechanism. Typical line scan 158 trigger intervals are 0.003 inches. During initial setup, the line scan camera 157a is triggered to start scanning by the lead edge detector 260 signal. When processing sheets S1 (201), S2 (203), and S3 (205), the line scan camera 157a is triggered to start the sheet image capture when the sheet is positioned at the cut line 273. A blade cycle trigger 306 is received at attribute sensor controller 310. The blade cycle trigger 306 is generated when a cutter blade servo controller/drive 302 confirms that a cutter blade servo 271 has moved the prescribed distance for a cut. The cut cycle is complete when a cutter encoder 272 readout matches the servo command. The cutter feeder servo controller/drive 305 receives conformation that the cut cycle has completed from the cutter blade servo controller/drive 302. The scan lines 158 are accumulated as the cutter feeds and cycles the sheets through the cut cycle. A ROI is defined by the camera job setting based on a position of the ROI to a top of a line scan image buffer, which corresponds to the lead edge of the sheet 70. The line scan camera 157a measures the distance 252 (in, e.g., pixels) of the existing feature 58-1 to the top of the image buffer. The distance measured by the line scan camera system 157a can be communicated to the cutter blade servo control 302 via a message protocol. As an alternative, an encoder can be configured to output a "sync" bit off of a differential distance based on a number of pixels measured from the start of the feed cycle.

FIG. 8, in reference with FIG. 10, illustrates some embodiments of the system after the cutter feeder transport rollers 265 are commanded to move the sheets S1 (201), S2 (203), and S3 (205) a distance 250. The cutter controller 300 sends the servo command to the servo motor 275. The command is based on a conversion of distance 250 into a count of encoder pulses that represents the distance to the cut line 273. For example, each encoder pulse represents $\frac{1}{100}^{th}$ of an inch for this implementation. Other encoder pulse resolutions maybe chosen, as well. The sheets S1 (201), S2 (203), and S3 (205) are stopped when the encoder 276 indicates sufficient distance 250 has been covered to place the lead edge 70 at the cut line 273. When the cutter feeder servo controller/drive 305 receives sufficient encoder 276 pulses to confirm that the sheet S1 (201) has moved distance 250 as determined by the number of encoder pulses that were received, the cutter feeder transport 132 is stopped. The parameters required for calibration and registration correction are defined in TABLE 1 below.

TABLE 1

| | |
|---|---|
| 250 | Cutter Feeder Design Parameter = Distance from leading edge sensor 260 to cut line 273. Units = millimeters/encoder pulses |
| 252 | Sheet Layout Design Parameter = Distance to top of existing feature 58 to leading edge 70. Units = millimeters |
| 252a | Distance to top of existing feature 58-1 to cut line 273 - measured from image. Units = line scans or pixels |
| 252b | Cutter Feeder And Camera Placement Design Parameter = Distance from leading edge 70 to scan line 158. Units = millimeters |

TABLE 1-continued

| | |
|---|---|
| 252c | Sheet Layout Design Parameter = Distance from top of existing feature 58-1 to scan line 158. Units converted to scan lines or pixels |
| CAL | Camera calibration = 252c design(converted to pixels) − 252c measured |
| 252d | Distance from top of existing feature 58-2 to the bottom of the image (last scan line) - measured from image. Units = line scans or pixels |
| SYNC | Sync error = 252c − 252d − converted to encoder pulses. |
| 158 REF | The reference point (image to transport) for sync measurement is the scan line 158 REF or cut line 273. |

Referring to FIG. 8, distance 252b comprises a difference between scan line 158 REF and leading edge 70 of the sheet when the sheet is registered to the cut line 273 based on the geometry of the camera 157a relative to the cutter feeder 132. A distance 252c comprises a difference between a top of the existing feature 58-1, as the last scan line of the captured image when the transport is stopped, and scan line 158 REF. A calibration value CAL is calculated by comparing a design distance for 252c versus a measured distance 252c. A measured number of image scan lines between the two points should be equal to a design number, unless the camera is aimed incorrectly or the encoder 276 is not accurate. A difference between the design values and the measured values is used to adjust other measured values during sheet processing. The calibration can be validated by comparing the design value for 252a versus the measured value for 252a. The measured number of scan lines between the first line of the image (cut line) and the scan line that contains the first part (i.e., the top) of the existing feature 58-1 represents the measured distance 252a.

Referring now to FIG. 9, subsequent sheet processing for which a cut position adjustment is required to maintain cutter sync with the printed material 200 is illustrated. Sheet S1 (201) is advanced in second direction 90 with a control command to move sheet S1 (201) one sheet length through the cutter 133 to locate the leading edge 71 for sheet S2 (203) at the cut line 273. For this example, there was slippage in the cutter feeder 132 causing sheet S1 (201) to be cut too short. As a result, an existing feature 58-2 on sheet S2 (203) is too close to a scan line 158a. An amount of slippage is measured with the camera system 157a or 159a. The distance 252c is greater than 252d, hence sheet S2 (203) will have to be advanced by a distance of one sheet length plus the error in distance (i.e., 252c-252d). When sheets S2 (203) and S3 (205) are advanced, the lead edge 72 of sheet S3 (205) will be lined up with the cut line 273. The error in registration of lead edges to the cut line 273 is small and therefore not noticeable since a correction is made with every sheet processed.

Figure 11:
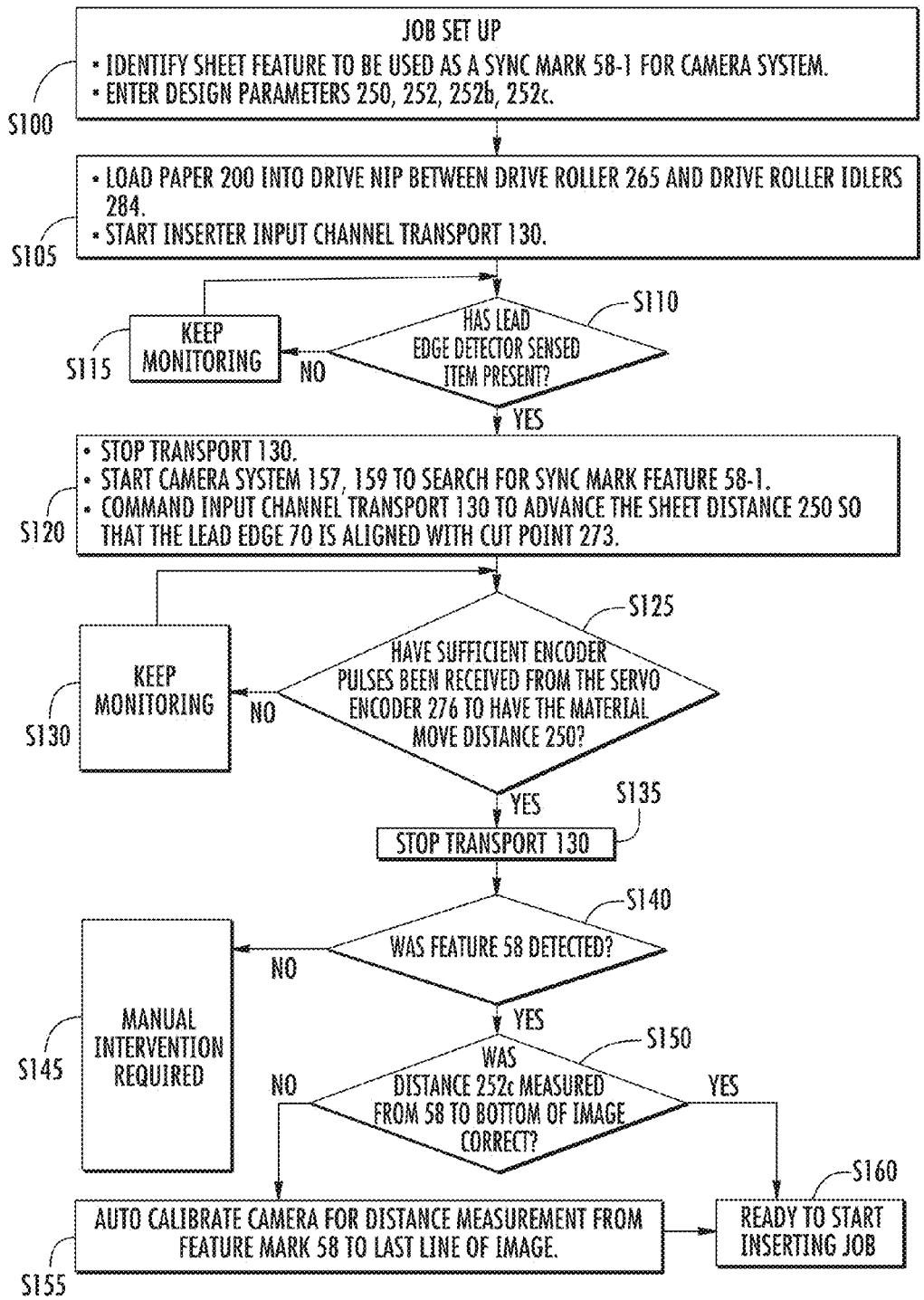
FIG. 11 illustrates an exemplary process flow diagram for inserting job initialization and material loading according to some embodiments of the present subject matter.

Reference is now made to FIG. 11 to review process flow diagram for inserting job initialization and material loading. In step S100, data entry and inserting job setup is performed. In a first sub step, an existing feature (e.g., 58-1) present on at least one or more sheet of continuous form material 200 may be specified based on detectability and use on every sheet. Such an existing feature 58-1 will be used as a sync mark for registration of the sheet and the cut line 273. In a second sub step, distances 250, 252, 252b, 252c are entered into the cutter controller 300 (see, e.g., TABLE 1).

In step S105, the operator loads the material 200 into a drive nip in the cutter feeder transport 132. The input channel 130 transport is initiated in a material load speed.

In step S110, the lead edge detector 160 is monitored for an item present condition. In step S115, the monitoring continues until a leading edge (e.g., 70) of a sheet of material 200 is detected.

In step S120, when the leading edge is detected, the transport is stopped; the camera system 157, 159 is initialized to start searching for the existing feature 58-1 on at least one or more individual sheet of the continuous form material. The input channel transport 130 is restarted with a command to move the material a distance of 250 so that the lead edge 70 is lined up with the cut line 273. The servo encoder 276 provides encoder pulses that correspond to the distance that the material has traveled.

In step S125, the encoder pulses are monitored (step S130) until sufficient pulses have been received at the control system to indicate that the material has moved distance 250.

In step S135, the transport 130 can be stopped upon receiving sufficient encoder pulses from the servo encoder 276.

In step S140, the camera system 157, 159 is configured to detect the existing feature 58-1 before the lead edge 70 has reached the cut line 273. If not, an error condition has occurred that requires intervention (step S145). The camera system 157, 159 can be configured to measure the distance from the top of the existing feature 58-1 to the last scan line in the collected image (distance 252c).

In step S150, if the measured distance 252c is equal to the design distance of 252c, within a tolerance, the inserting job is ready to be started in step S160. If the difference between the desired design distance 252c and the measured distance 252c is outside the tolerance, camera calibration is required, (step S155).

The camera calibration value can be based on the difference between the design value 252 and the measured value 252a, step S155. The difference between the measured value and the design value may be very small since the transport was started and stopped in such a manner that slippage of the material 200 is unlikely. In addition, the amount of transport movement was accurately validated by the encoder 276 readout. Once the calibration value is known, it will be applied to the future measured values 252a. Once the camera calibration value is known, the inserting job is ready to start, step S160. The input channel 130 has numerous possible components as shown in FIG. 1. During the initial set up, all of the components 131-136 do not need to start at the same time when loading the transport. For example, the document feeder 131 may be loaded without the rest of the input channel 130 being moved. Similarly, the material may be advanced in the cutter feeder 132 by using an operator interface 137 (see, e.g., FIG. 5) on the side of the unit. Only the document feeder 131 and the cutter feeder 132 would have to advance material 200. Other design options may also be employed for transport control.

Figure 12:
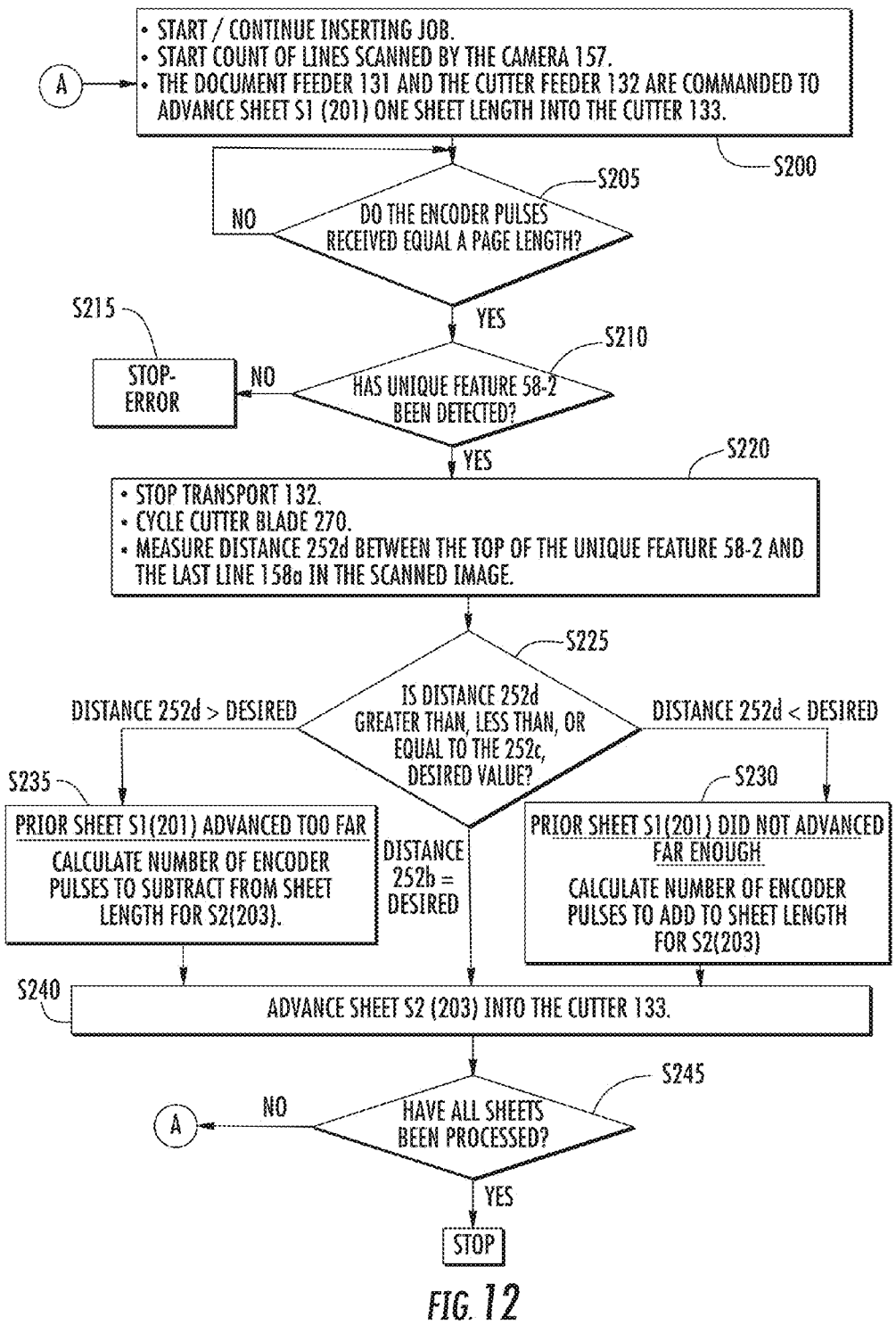
FIG. 12 illustrates an exemplary process flow diagram for inserting run time control according to some embodiments of the present subject matter.

Reference is now made to FIG. 12 to review the process flow for inserting run time control. In step S200, an inserting job is started and the document feeder 131 and cutter feeder 132 are commanded to advance sheet S1 (201) one page length into the cutter 133. The pulses from the encoder 276 integrated into the servo motor 275 are monitored in step S205 to determine when the sheet S1 (201) has moved one sheet length. The camera system 157, 159 is monitored in step S210 to determine if an existing feature 58-2 has been detected. If not, in step S215, an error condition can be noted and the machine may be stopped.

In step S220, the transport 130 can be stopped and a cutter blade 270 is cycled. The camera system can capture an image of a position of the existing feature and measure a distance 252d, in pixels or line scans, for the distance between a top of the existing feature 58-2 to a bottom of the collected image. The next steps S225, S230, S235 and S240 are the process steps that keep the intended lead edge of the sheets synchronized with the cut line.

If the measured distance 252d is less than the desired distance 252c, in step S225, the prior sheet did not advance far enough, which will make the prior sheet too short and the next sheet too long if synchronization is not reestablished. The difference between distances 252d and 252c are converted to encoder pulse counts and added to the already known count of encoder pulses that are equivalent to a sheet length, in step S230. Similarly, if the measured distance 252b is greater than the desired distance 252c, in step S225, the prior sheet advanced too far which will make the prior sheet too long and the next sheet too short if synchronization is not reestablished. The difference between distances 252d and 252c is converted to encoder pulse counts and subtracted from the already known count of encoder pulses that are equivalent to a sheet length, in step S235. If the measured distance 252b is within tolerance, the next sheet S2 (203) may be advanced into the cutter 133, in step S240. After page length adjustments have been made in steps S230 and S235, control is transferred to step S240. If all sheets in the inserting job have been processed, in step S245, the job is ended. Otherwise control is returned to the top of the process flow (A).

Figures 13A, 13B, 13C:
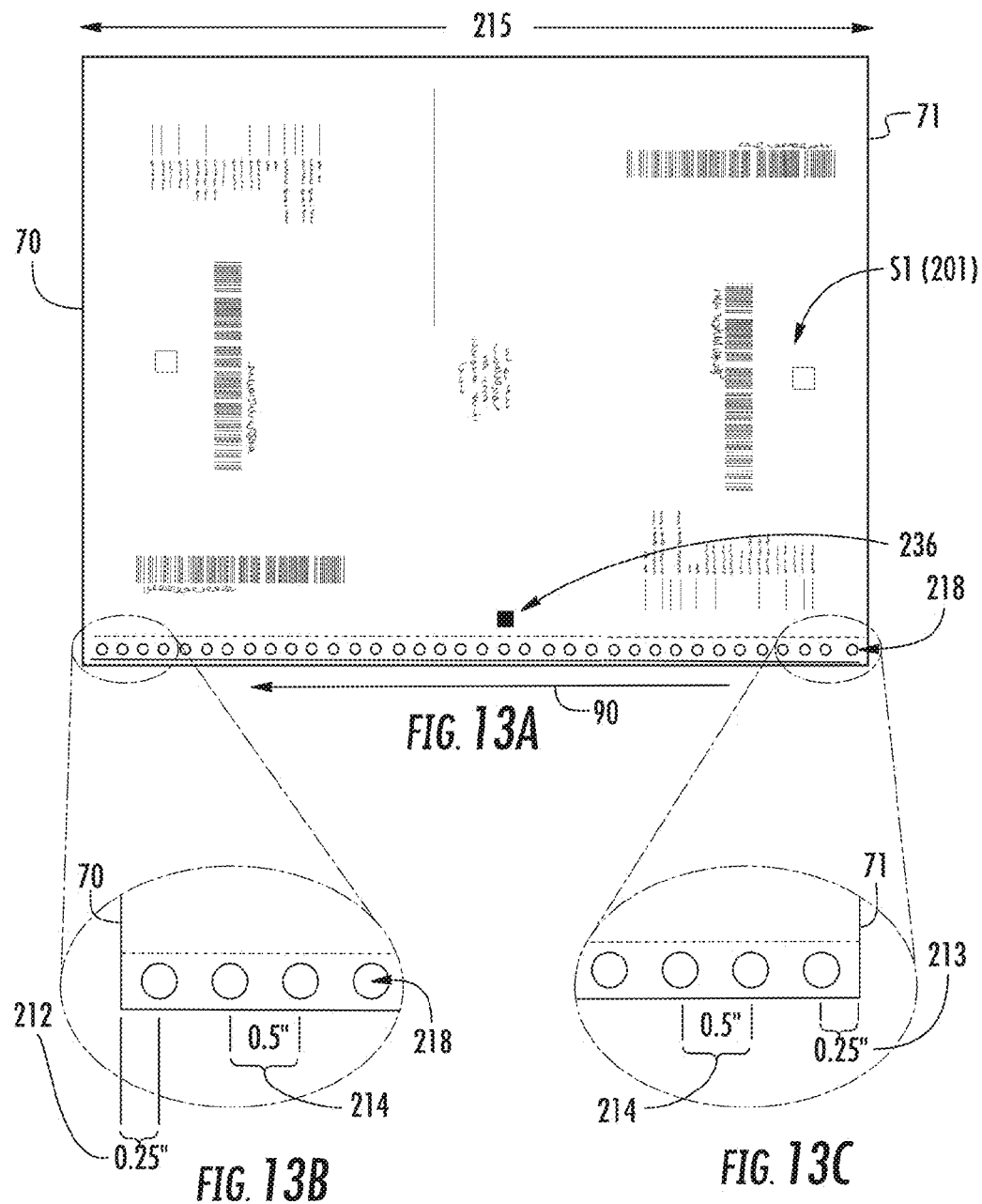
FIG. 13A illustrates an exemplary printed sheet with pin holes having one or more characteristics according to some embodiments of the present subject matter.
FIGS. 13B-13C each illustrate a detailed view of the exemplary printed sheet of FIG. 13A.

An alternative process to determine cutter variation from cut to cut and to insure proper cutter alignment during the initial material loading on a tractorless pin-less cutter, is to use the pin holes 218 that exist on the material 200 being processed. Pin hole material 200 is still in use by printer systems and pin hole material may still be in inventory that needs to be used up. The illustration in FIG. 13A is for a slit and merge over/under configuration. Therefore, pin holes 218 are only on one side of the material. The pin hole spacing is standardized so that one design fits all applications. FIGS. 13B-13C each provide a detailed illustration of the sizing, spacing, etc., of each of the pin holes 218. For example, a center of the first hole 212 is spaced 0.25" from the leading edge 70 of the sheet S1 (201). The last hole 213 of sheet S1 (201) is spaced 0.25" from a trailing edge 71. The spacing, center of hole to center of the next hole 214, is 0.5". Every sheet is the same length 215 and therefore contains the same number of holes and has the same encoder 276 pulse count. A single photocell (reflective or active) can be used to detect and count holes to position the sheet correctly relative to the cut line 273. Hole spacing is measured from the center of the hole to the center of the next hole. This is accomplished by reading the encoder value when the sensor turns on (i.e., sees through the hole) and reading the encoder again when the sensor is blocked. The difference between the encoder values represents the hole width and the center would be the middle encoder value. The number of encoder pulses between the hole centers produces an accurate measure of the hole spacing. The spacing calculation is not affected if the pin holes do not pass directly over the sensor since the center is still the middle encoder pulse between the sensor on and the sensor off.

Since the cutter feeder 132 is driven by a servo motor 275 and all movement is reported by the encoder 276, the sheet can be moved distances smaller than a hole spacing to achieve accurate cutter synchronization with the sheet. In addition, the area scan camera system 159 or a line scan camera system 157 can be used to detect and count the pin holes 218. The camera systems can measure the distance from the center of hole one 214 in pixels to capture the distance data for fine position adjustments. A residual sync mark 236 may be printed on the sheet even though it is not required.

Figure 14:
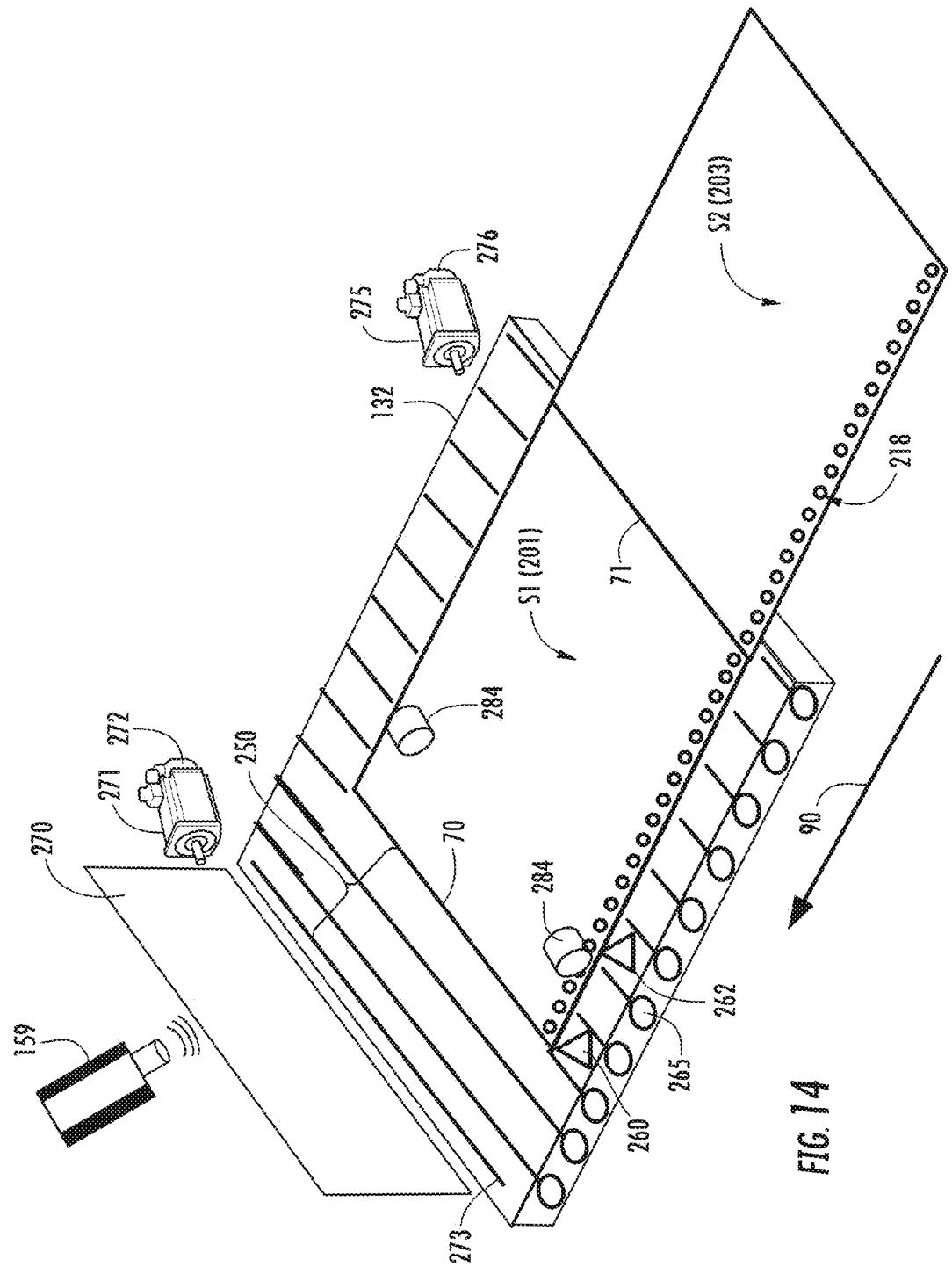
FIG. 14 illustrates a functional diagram of a material loading process and initial synchronization with a cutter for material with pin holes according to some embodiments of the present subject matter.
Figure 17:
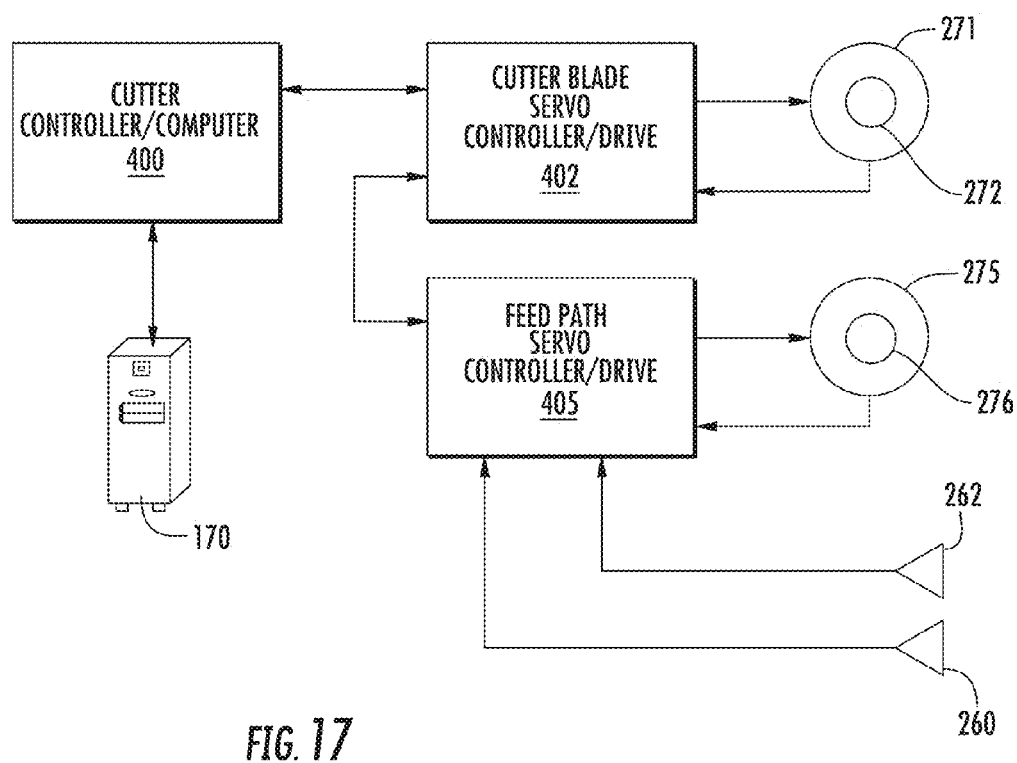
FIG. 17 illustrates an exemplary block diagram of a cutter and servo feed control system and a camera used to measure a position of a last pin hole according to some embodiments of the present subject matter.

FIG. 14 in conjunction with FIG. 17 illustrates the relationship of the cutter blade 270 to the lead edge sensor 260 and the pin hole sensor 262. It is possible to eliminate the pin hole sensor 262 in some cutter feeder 132 geometries and just use the lead edge sensor 260 for both functions. When using the lead edge sensor 260, the lead edge 70 of the material sheet S1 (201) is required to be pre-cut or torn at the perforated edge to the top edge of the sheet. The operator loads the fan fold or roll material 200 into the nip formed by the drive roller 265 and drive roller idler 284. The cutter controller 400 commands the feed path servo controller/drive 405 to feed the sheet S1 (201) until the lead edge sensor 260 detects sheet S1 (201). The lead edge 70 is now distance 250 from the cut line 273. The transport 132 may be momentarily stopped for system initialization or the command to advance the sheet S1 (201) distance 250 to the cutter registration point (i.e., cut line 273) may be sent immediately to the feed path servo 405. The encoder 276 pulses are counted until the count equals the number of pulses that are equivalent to moving the material the distance 250. The cutter controller 400 will start counting encoder 276 pulses as soon as the material starts moving and the pin hole sensor 262, in conjunction with the cutter controller 400, can determine the center 217 of the each hole detected and record the encoder count for each pin hole center 217. The distance 250 and the position of pin hole sensor 262 are designed to ensure that the pin hole sensor is blocked at the completion of material movement (i.e., distance 250).

Figure 15:
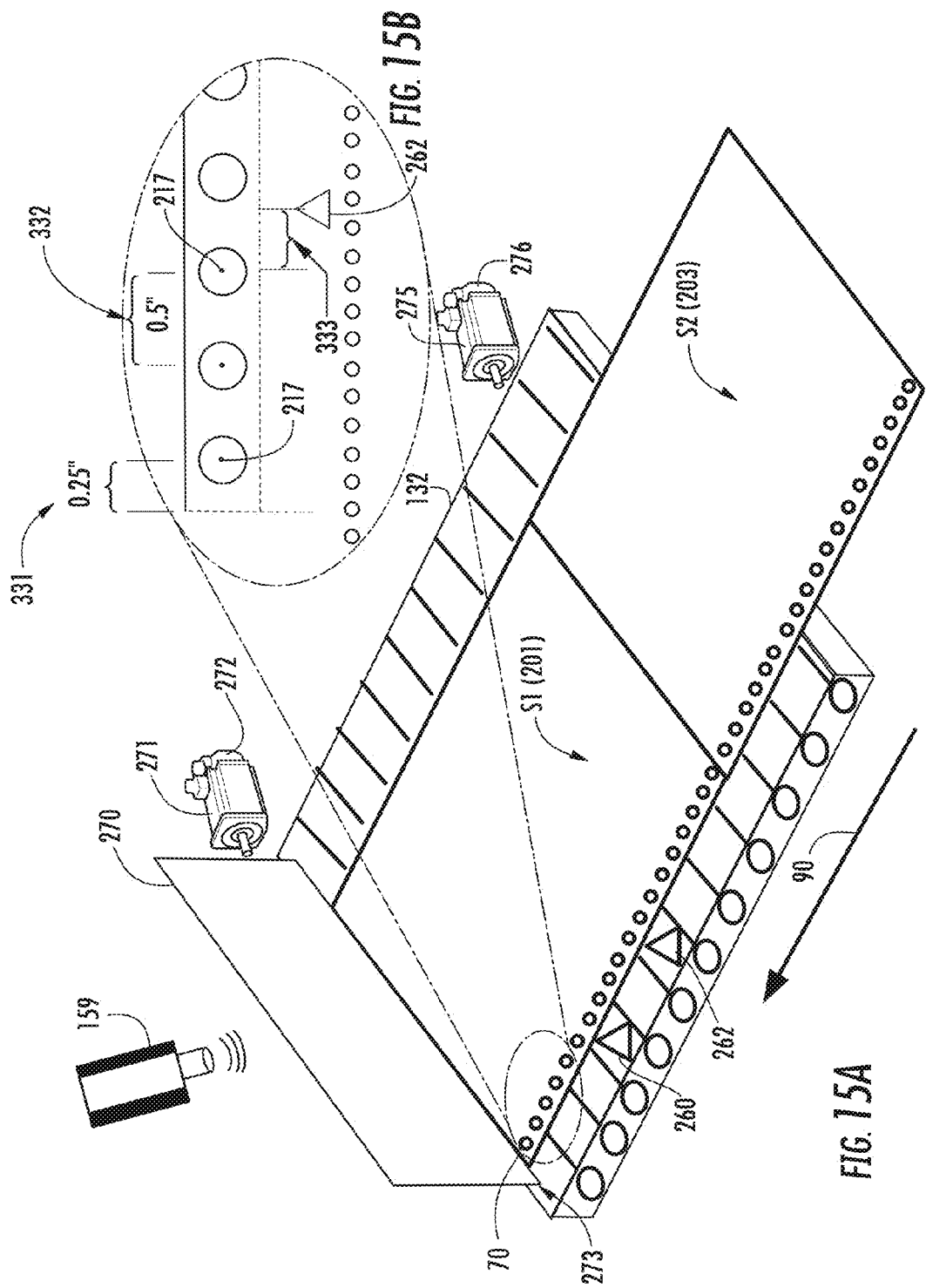
FIG. 15A illustrates a functional diagram of a sheet of material with pin holes positioned for initial synchronization according to some embodiments of the present subject matter.
FIG. 15B illustrates a detailed view of the functional diagram of FIG. 15A.

Turning now to FIGS. 15A-15B, the initialization process is illustrated. At the completion of the movement of distance 250, the lead edge 70 is at the cutter blade 270 and the center 217 of the first hole is 0.25 inches (331) from the cut line 273. The calibration value for the pin hole sensor 262 position on the transport is equal to the distance 333, in encoder counts, measured from the center of the last pin hole 217, before the material stopped moving, to the encoder count when the material is stopped.

Figure 16:
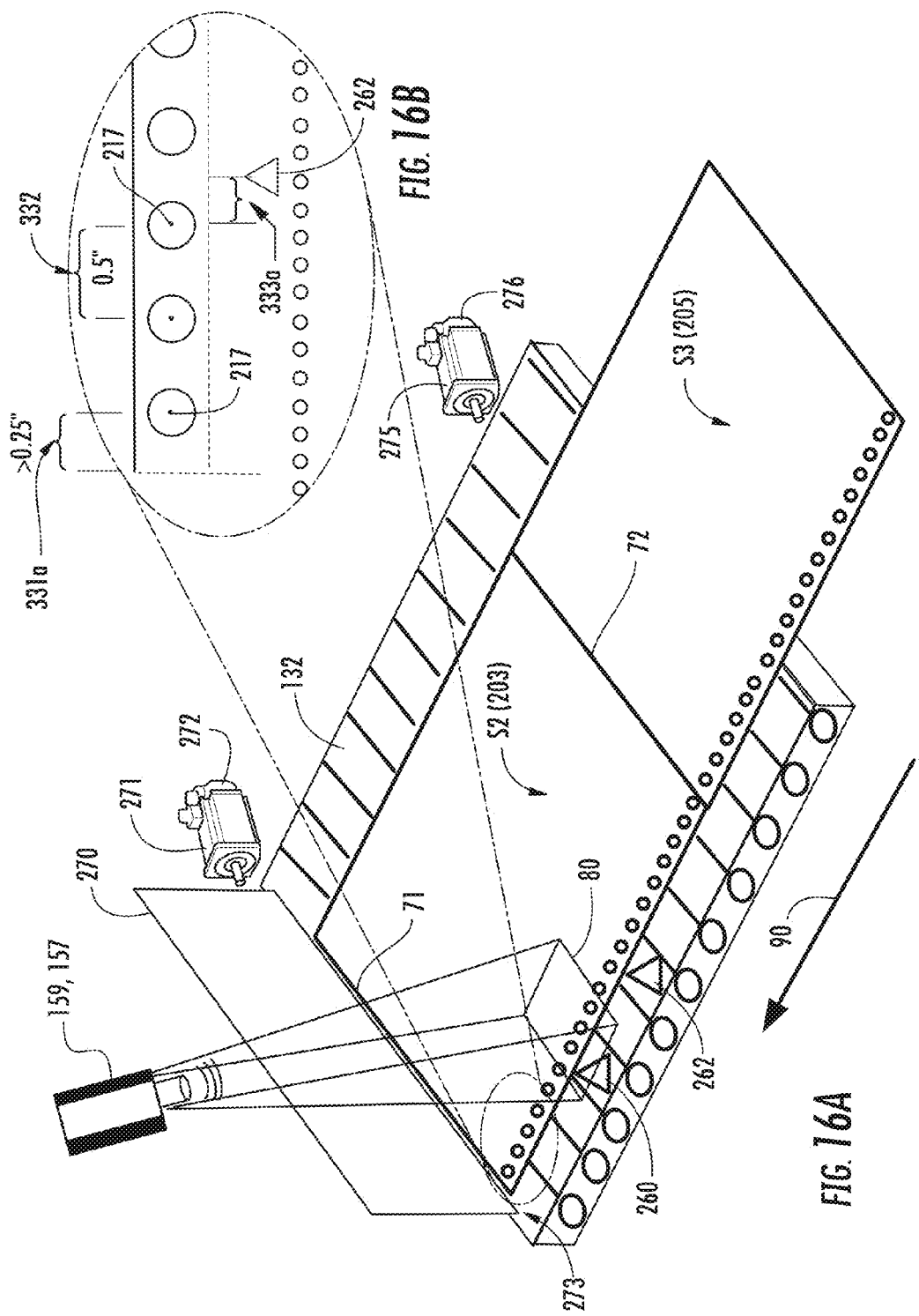
FIG. 16A illustrates a functional diagram of a subsequent sheet of material with pin holes for which a cut position adjustment is required to maintain cutter sync with already printed material for material according to some embodiments of the present subject matter.
FIG. 16B illustrates a detailed view of the functional diagram of FIG. 16A.

FIGS. 16A-16B illustrate the cutting process required to maintain cutter registration during continuous operation. The cutter controller 400 commands the feed path servo motor 275 to advance the sheet material the number of encoder counts equivalent to a page length. As illustrated in FIG. 16A, this movement will advance sheet S1 (201) through the cutter 133 and advance the lead edge 71 of sheet S2 (203) to the cut line 273. At this point the cutter blade 270 will cycle based on commands from the cutter blade servo controller 402 to the cutter blade servo 271. Proper cutter blade cycle is verified with feedback from the cutter servo encoder 272. For the example shown in FIG. 16B, the sheet S2 (203) slipped during the sheet advancement. As a result the distance 331a from the center of the first pin hole from the cut line 273 is greater than 0.25 inches. This indicates that the sheet S2 (203) did not advance far enough to equal a full sheet. The encoder count 333a from the center of the last hole sensed is less than the expected value 333. The difference between 333 and 333a equals the slippage error and may be added to the full length encoder count when sheet S3 (205) is advanced to the cut line 273.

During sheet advancement, the holes may be counted to the sure that the error in movement did not result in an error large enough to miss a pin hole entirely. As an option, a camera 159, 157 with a FOV 80 that overlaps the pin holes can be used to measure the pin hole centers. On an over/under pin-less cutter, the two slit and merge streams require separate, independent lead edge sensors and pin feed hole sensors.

Figure 18:
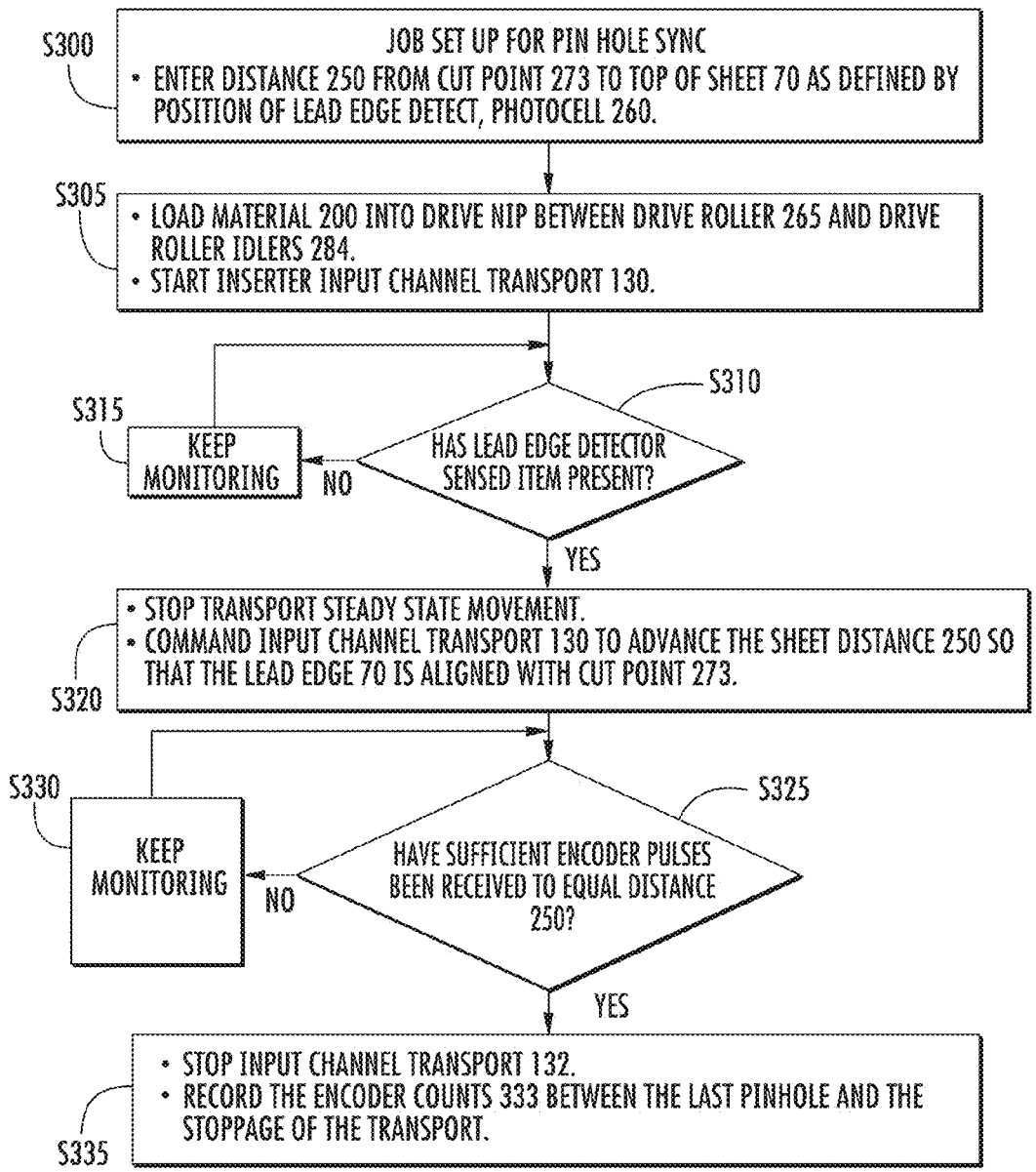
FIG. 18 illustrates an exemplary process flow diagram for inserting job initialization and material loading according to some embodiments of the present subject matter.

Referring to FIG. 18, a functional flow for setup and material loading using pin holes is described. In step S300, necessary job parameters are input such as the distance from the cut line 273 to the lead edge sensor 260, which also represents the lead edge 70 position after material load.

In step S305, material 200 is loaded into the drive nip between the drive roller 265 and the drive roller idlers 284. Next, the necessary input channel 130 transports are started and commanded to move the material 200 forward until the lead edge 70 is detected, steps S310 and S315. When the lead edge 70 is detected, the transports are stopped or paused, step S320. The input channel 130 is then commanded to advance the sheet the distance 250 so that the lead edge 70 is aligned with the cut line 273.

In steps S325 and S330, encoder pulses are monitor until sufficient pulses have been received to indicate that the material has moved distance 250.

In step S335, the input channel transports 130, which includes the cutter feeder 132, are stopped. The encoder counts 333, which represents the distance between the last pin hole center and the last encoder pulse received when the transport stopped, is stored to use in run time synchronization control.

Figure 19:
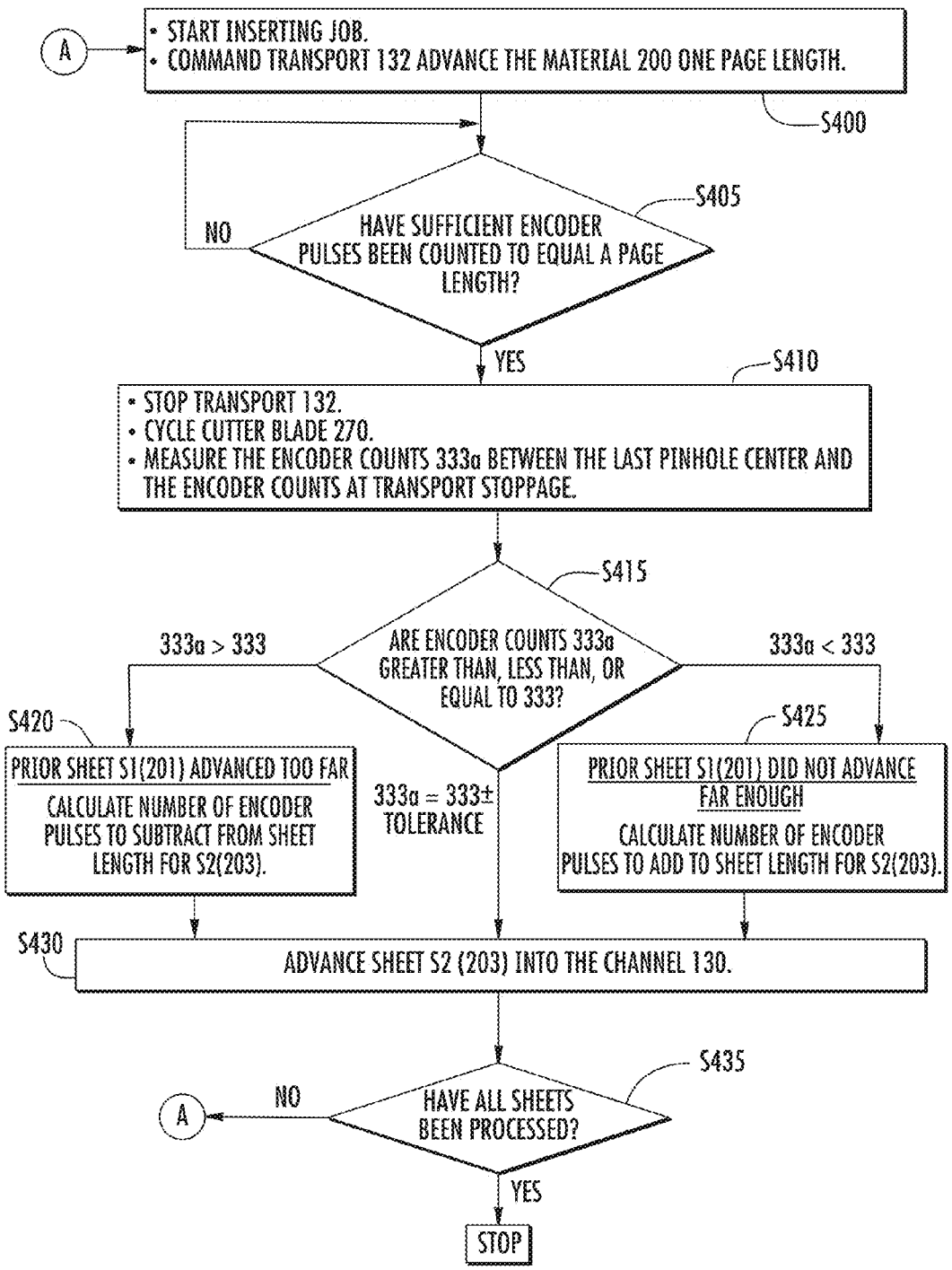
FIG. 19 illustrates an exemplary process flow diagram for inserting run time control according to some embodiments of the present subject matter.

Turning to FIG. 19, a run time control process is illustrated. In step S400, the inserting job is started and the transports are commanded to advance the material 200 one page length.

In step S405, the encoder pulses 276 are counted during the material movement to determine when sufficient encoder pulses have been received to equal the number associated with a page length.

In step S410, when the count is reached, the transport is stopped and the cutter blade 270 is cycled to separate sheet S1 (201) from sheet S2 (203). The encoder pulses are counted 333a that represent the distance from the center of the last pin hole detected and the last encoder pulse received before the transport stopped. Step S415 determines if the encoder pulse count 333a is greater than, less than or equal to the encoder pulse counts 333 stored during setup, step S335. If 333a is greater than 333, sheet S1 (201) was advanced too far, step S420. The difference between encoder pulse counts 333a and 333 is subtracted from the encoder pulse count for a full page so that sheet S2 (203) will be advanced a shorter distance. As a result, the lead edge 72 of sheet S3 (205) will be correctly synchronized with the cut line 273 when the cutter is cycled. If 333a is less than 333, sheet S1 was advanced far enough, step S425. The difference between encoder pulse counts 333a and 333 is added to the encoder pulse count for a full page so that sheet S2 will be advanced a longer distance.

In step S430, the lead edge 72 of sheet S3 (205) may be correctly synchronized with the cut line 273 when the cutter is cycled. If encoder pulse count 333a equals 333, within a tolerance, no correction is made. Sheet S2 (203) may then be advanced into the cutter 133 and input channel 130 by a corrected page length encoder pulse count to maintain synchronization.

In step S435, a determination via the control system (e.g., 400, 170) if any more sheets may be processed for the inserter job. If there are more sheets, the sheet count is advanced and control is returned to step S400. Otherwise the job is complete and no more material will be cut. When all in-process mailpieces are completed, the inserter is stopped.

As shown by the above discussion, functions relating pertain to the operation of an inserting system using a tractor-less cutter feeder is implemented in the hardware and controlled by one or more computers operating as the controller 170 connected the inserting system and to a data center processor/server 172 for data communication with the processing resources as shown in FIG. 1. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer that functions as the controller 170 and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for tracking of mail items through a postal authority network with reference to a specific mail target, in essentially the manner performed in the implementations discussed and illustrated herein.

Figure 20:
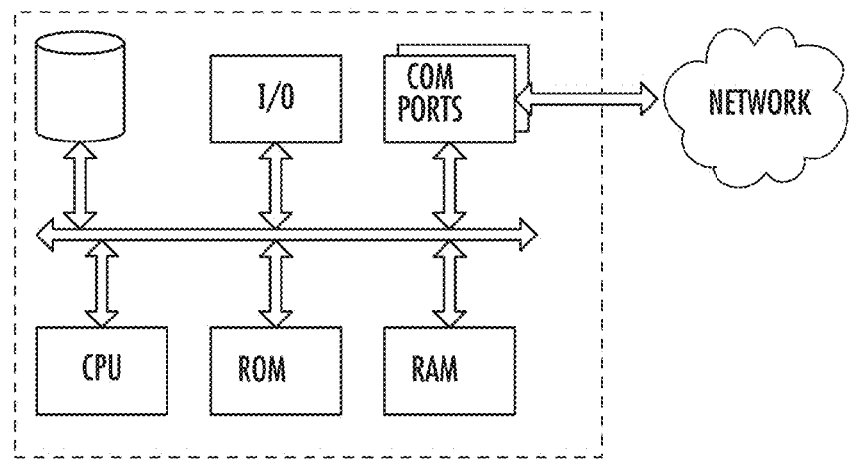
FIG. 20 illustrates a network or host computer platform, as may typically be used to implement a server according to some embodiments of the present subject matter.
Figure 21:
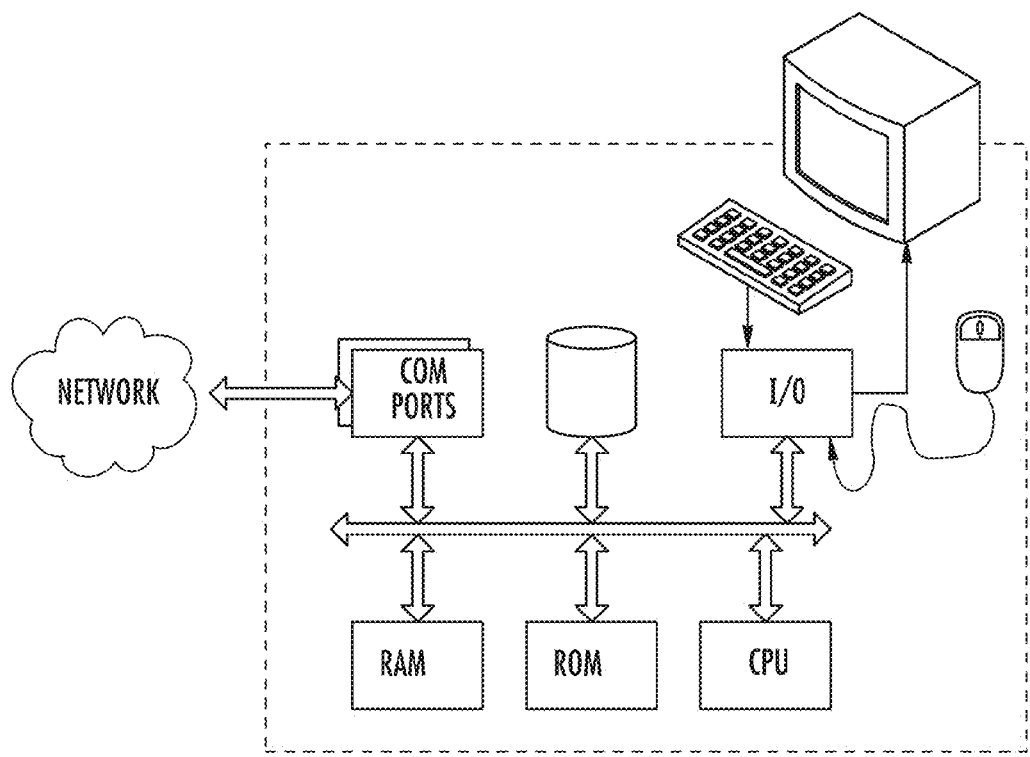
FIG. 21 illustrates a computer with user interface elements, as may be used to implement a personal computer or other type of work station or terminal device according to some embodiments of the present subject matter.

FIGS. 20-21 illustrate functional block diagram illustrations of general purpose computer hardware platforms. FIG. 20 illustrates a network or host computer platform, as may typically be used to implement a server. FIG. 21 depicts a computer with user interface elements, as may be used to implement a personal computer or other type of work station or terminal device, although the computer of FIG. 21 may also act as a server if appropriately programmed. It is believed that those skilled in the art are familiar with the structure, programming and general operation of such computer equipment and, as a result, the drawings should be self-explanatory.

For example, controller 170 may be a PC based implementation of a central control processing system like that of FIG. 22, or may be implemented on a platform configured as a central or host computer or server 172 like that of FIG. 20. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH- EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for tracking of mail items through a postal authority network with reference to a specific mail target, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In the detailed description above, numerous specific details are set forth by way of examples in order to provide a thorough understanding of the relevant teachings. However, it should be apparent to those skilled in the art that the present teachings may be practiced without such details. In other instances, well known methods, procedures, components, and software have been described at a relatively high-level, without detail, in order to avoid unnecessarily obscuring aspects of the present teachings.

What is claimed is:

1. A system for sheet registration, the system comprising:
a tractorless sheet processing device comprising:
  a cutter for cutting individual sheets from continuous form material, and
  a cutter feeder comprising transport rollers for feeding the continuous form material to the cutter;
a camera disposed relative to the cutter feeder and configured to capture an image of a position of at least one existing sheet feature on at least one of the individual sheets of the continuous form material in order to synchronously register each of the individual sheets with the cutter;
a controller including at least one hardware processor and memory, the controller being configured to interface with the camera and the tractorless sheet processing device; and
a first sensor configured to detect a lead edge of a first sheet of the at least one of the individual sheets.

2. The system of claim 1, wherein the controller is configured to calculate measurements for the sheet registration based on parameters measured by the camera.

3. The system of claim 2, wherein the calculated measurements are compared against design parameters stored in a storage device associated with the controller, and wherein, if the calculated measurements are outside tolerances configured for the design parameters, the camera is configured to be recalibrated based on a difference between the calculated measurements and the design parameters.

4. The system of claim 3, wherein the design parameters are configured to be input to the controller, the design parameters including at least one of: a cutter feeder design parameter, a sheet layout design parameter, a cutter feeder and camera placement design parameter, and a sheet layout design parameter.

5. The system of claim 1, wherein the camera is an area scan camera utilizing a charge-coupled device (CCD) array configured to capture the image of the position of the at least one existing sheet feature within a field of view (FOV) of the camera, wherein the camera is triggered, based on either the first sensor detecting the lead edge of the first sheet and/or a blade cycle when the cutter is registered during a cut cycle dwell, to capture the image of the position of the at least one existing sheet feature when the at least one existing sheet feature is within the FOV and to measure a distance from the position of the at least one existing sheet feature to an edge of the FOV.

6. The system of claim 1, wherein the camera is a line scan camera, wherein the camera is triggered, based on either the first sensor detecting the lead edge of the first sheet and/or a subsequent sheet of the at least one of the individual sheets is positioned at the cut line, to capture the image of the position of the at least one existing sheet feature by scanning the at least one of the individual sheets at predetermined positional intervals and to measure a distance from the position of the at least one existing sheet feature to a lead edge of a corresponding one of the at least one of the individual sheets.

7. The system of claim 1, wherein the at least one existing sheet feature comprises at least one pin hole, such that the system further comprises a second sensor configured to detect the at least one pin hole in the at least one or more of the individual sheets of the continuous form material.

8. The system of claim 7, further comprising an encoder configured to transmit pulses to the controller, which is configured for counting of the pulses from the encoder, wherein a predetermined encoder pulse count corresponds to a distance between a cutter registration point and a leading edge of each of the individual sheets.

9. The system of claim 7, wherein the camera is configured to capture the image of the position of the at least one pin hole encompassed by a field of view (FOV) of the camera, such that the camera is triggered, by the second sensor detecting the at least one pin hole, to capture the image of the position of the at least one pin hole when the at least one pin hole is within the FOV and to measure the position of a center of the at least one pin hole against another reference point.

10. The system of claim 1, wherein the at least one existing sheet feature comprises at least one of a plurality of pin feed holes, an image, an image pattern, and a logo formed on the at least one of the individual sheets of the continuous form material.

11. The system of claim 1, further comprising at least one servo motor interfacing with the controller for advancing each of the at least one of the individual sheets into the cutter feeder until a leading edge of each is detected by at the first sensor.

12. A method for sheet registration, the method comprising:
interfacing, at a controller including at least one hardware processor and memory, with a camera and a tractorless sheet processing device including a cutter and a cutter feeder in order to control the camera and the tractorless sheet processing device;
feeding, using the cutter feeder, continuous form material to the cutter for cutting individual sheets from continuous form material;
capturing, using the camera, an image of a position of at least one existing sheet feature on at least one of the individual sheets of the continuous form material in order to synchronously register each of the individual sheets with the cutter;
detecting, using a first sensor, a lead edge of a first sheet of the at least one of the individual sheets when the lead edge is at a first position;
advancing the first sheet to a second position where the lead edge of the first sheet is at a cut line of the cutter;
measuring a first distance, which is a distance traveled by the lead edge of the first sheet between the first and second positions;
comparing the first distance with a first calibration value, wherein the first calibration value is a predetermined design distance between the first sensor and the cut line of the cutter; and
using a difference between the first distance and the first calibration value to adjust other measured values during sheet processing.

13. The method of claim 12, further comprising calculating measurements for the sheet registration based on parameters measured by the camera.

14. The method of claim 13, further comprising comparing the calculated measurements against design parameters stored in a storage device associated with the controller, and wherein, if the calculated measurements are outside tolerances configured for the design parameters, the method further comprises recalibrating the camera based on a difference between the calculated measurements and the design parameters.

15. The method of claim 14, further comprising inputting the design parameters to the controller, the design parameters including at least one of: a cutter feeder design parameter, a sheet layout design parameter, a cutter feeder and camera placement design parameter, and a sheet layout design parameter.

16. The method of claim 12, wherein capturing, using the camera, comprises:
   triggering the camera based on either the first sensor detecting the lead edge of the first sheet and/or a blade cycle when the cutter is registered during a cut cycle dwell,
   capturing the image of the position of the at least one existing sheet feature within a field of view (FOV) of the camera when the at least one existing sheet feature is within the FOV, and
   measuring a distance from the position of the at least one existing sheet feature to an edge of the FOV,
   wherein the camera is an area scan camera utilizing a charge-coupled device (CCD) array.

17. The method of claim 12, wherein capturing, using the camera, comprises:
   triggering the camera based on either the first sensor detecting the lead edge of the first sheet and/or a subsequent sheet of the at least one of the individual sheets is positioned at the cut line;
   scanning the at least one of the individual sheets at predetermined positional intervals; and
   measuring the position of the at least one existing sheet feature to a lead edge of a corresponding one of the at least one of the individual sheets.

18. The method of claim 12, wherein the at least one existing sheet feature comprises at least one pin hole, such that the method further comprises detecting, by a second sensor, the at least one pin hole in the at least one or more of the individual sheets of the continuous form material.

19. The method of claim 18, further comprising:
   triggering, by a sensor detecting the at least one pin hole on the at least one of of the individual sheets with the second sensor, the camera to capture the image of the position of the at least one pin hole encompassed by a field of view (FOV) of the camera when the at least one pin hole is within the FOV; and
   measuring the position of a center of the at least one pin hole against another reference point.

20. A non-transitory computer readable medium having stored thereon computer executable instructions embodied in a computer readable medium and when executed by a processor of a computer performs steps comprising:
   interfacing, at a controller including at least one hardware processor and memory, with a camera and a tractorless sheet processing device including a cutter and a cutter feeder in order to control the camera and the tractorless sheet processing device;
   feeding, using the cutter feeder, continuous form material to the cutter for cutting individual sheets from continuous form material;
   capturing, using the camera, an image of a position of at least one existing sheet feature on at least one of the individual sheets of the continuous form material in order to synchronously register each of the individual sheets with the cutter;
   detecting, using a first sensor, a lead edge of a first sheet of the at least one or more of the individual sheets when the lead edge is at a first position;
   advancing the first sheet to a second position where the lead edge of the first sheet is at a cut line of the cutter;
   measuring a first distance, which is a distance traveled by the lead edge of the first sheet between the first and second positions;
   comparing the first distance with a first calibration value, wherein the first calibration value is a predetermined design distance between the first sensor and the cut line of the cutter; and
   using a difference between the first distance and the first calibration value to adjust other measured values during sheet processing.

* * * * *